United States Patent
Onggosanusi et al.

(10) Patent No.: US 8,134,996 B2
(45) Date of Patent: Mar. 13, 2012

(54) DOWNLINK SYNCHRONIZATION FOR A CELLULAR OFDM COMMUNICATION SYSTEM

(75) Inventors: Eko N. Onggosanusi, Allen, TX (US); Anand G. Dabak, Plano, TX (US); Timothy M. Schmidl, Dallas, TX (US); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 999 days.

(21) Appl. No.: 11/459,313

(22) Filed: Jul. 21, 2006

(65) Prior Publication Data

US 2008/0019350 A1   Jan. 24, 2008

Related U.S. Application Data

(60) Provisional application No. 60/701,267, filed on Jul. 21, 2005.

(51) Int. Cl.
*H04J 3/06* (2006.01)
(52) U.S. Cl. ........ 370/350; 455/502; 455/525; 455/560; 455/561; 455/442
(58) Field of Classification Search ............ 370/337, 370/338, 348, 350; 455/502, 443, 450, 525, 455/561; 375/145
See application file for complete search history.

(56) References Cited

U.S. PATENT DOCUMENTS

| | | | |
|---|---|---|---|
| 5,930,366 A | 7/1999 | Jamal et al. | |
| 6,185,244 B1 * | 2/2001 | Nystrom et al. | 375/145 |
| 6,504,830 B1 * | 1/2003 | Ostberg et al. | 370/342 |
| 6,717,930 B1 | 4/2004 | Sezgin et al. | |
| 6,728,297 B2 * | 4/2004 | Rudolf | 375/145 |
| 6,894,995 B2 | 5/2005 | Chitrapu et al. | |
| 6,947,402 B2 | 9/2005 | Sezgin et al. | |
| 7,110,782 B2 * | 9/2006 | Yamaguchi | 455/502 |
| 7,212,821 B2 * | 5/2007 | Laroia et | 455/437 |
| 7,248,621 B2 | 7/2007 | Rudolf | |
| 7,289,483 B1 | 10/2007 | Lim | |
| 7,336,635 B2 | 2/2008 | Giancola et al. | |
| 7,907,592 B2 * | 3/2011 | Han et al. | 370/350 |
| 8,010,138 B2 * | 8/2011 | Kuru | 455/502 |
| 8,031,745 B2 * | 10/2011 | Onggosanusi et al. | 370/503 |
| 2002/0075833 A1 * | 6/2002 | Dick et al. | 370/336 |
| 2003/0156574 A1 * | 8/2003 | Raaf | 370/350 |
| 2004/0258041 A1 * | 12/2004 | Lin | 370/350 |
| 2005/0221848 A1 * | 10/2005 | Chitrapu et al. | 455/502 |
| 2006/0114812 A1 * | 6/2006 | Kim et al. | 370/206 |
| 2007/0133390 A1 | 6/2007 | Luo et al. | |
| 2007/0140106 A1 * | 6/2007 | Tsai et al. | 370/208 |
| 2007/0183391 A1 | 8/2007 | Akita et al. | |
| 2008/0019350 A1 | 1/2008 | Onggosanusi et al. | |

\* cited by examiner

*Primary Examiner* — Sharad Rampuria
(74) *Attorney, Agent, or Firm* — Ronald O. Neerings; Wade James Brady, III; Frederick J. Telecky, Jr.

(57) ABSTRACT

The present invention provides a method of operating a base station transmitter. In one embodiment, the method includes providing a cellular downlink synchronization signal having primary and secondary portions, wherein the primary portion is common for all cells and the secondary portion is cell-specific and transmitting the cellular downlink synchronization signal. In another embodiment, the method includes providing a cellular downlink synchronization signal having primary and secondary portions wherein the primary portion employs a corresponding one of a plurality of different primary signals allocated to adjoining transmission cells. The method also includes further providing cell-specific information in the secondary portion and transmitting the cellular downlink synchronization signal. The present invention also provides a method of operating user equipment. The method includes receiving a cellular downlink synchronization signal having primary and secondary portions wherein the secondary portion provides cell-specific parameters and identifying and extracting the secondary portion.

52 Claims, 21 Drawing Sheets

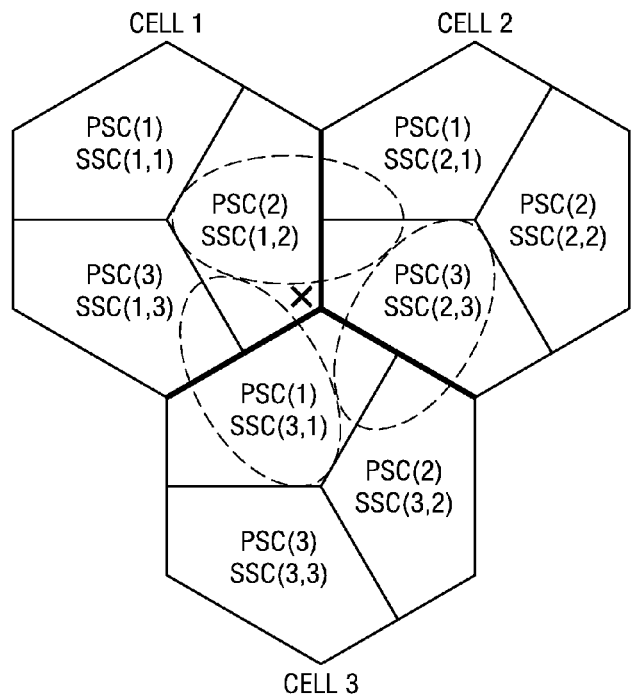
*FIG. 2A*
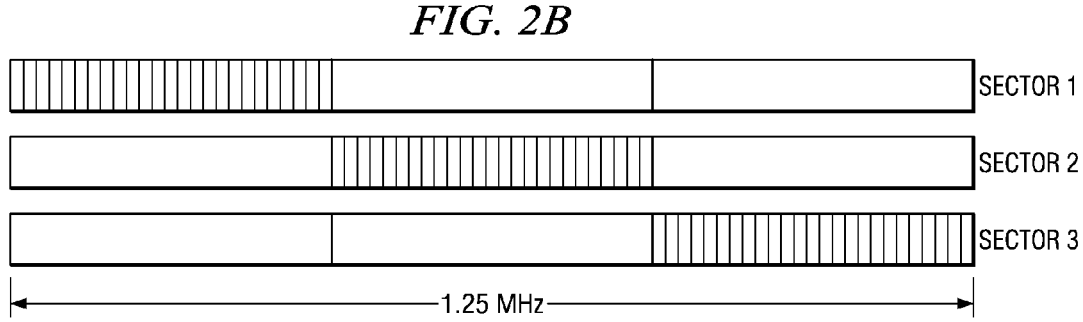
*FIG. 2B*
*FIG. 3A*
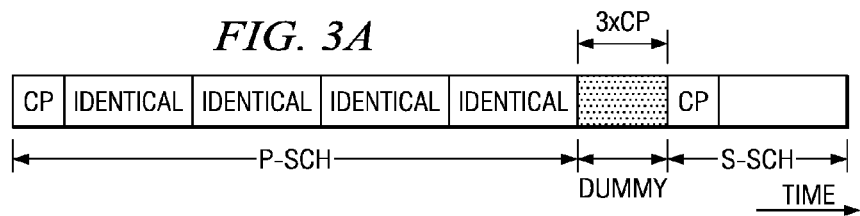
*FIG. 3B*
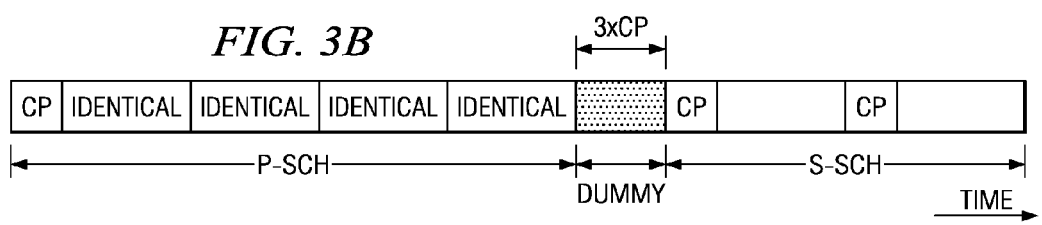

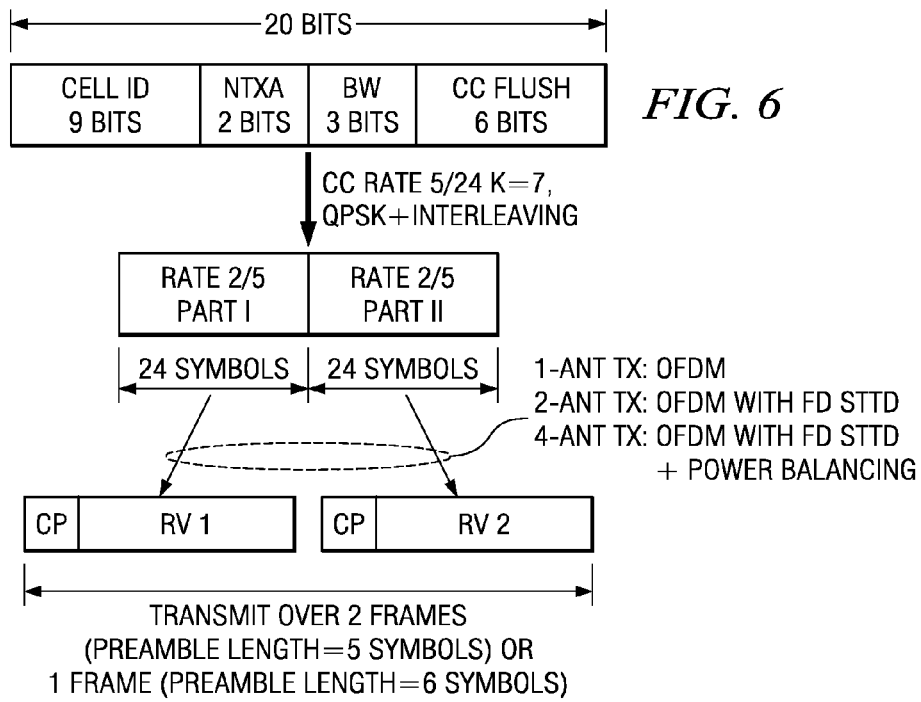
FIG. 6
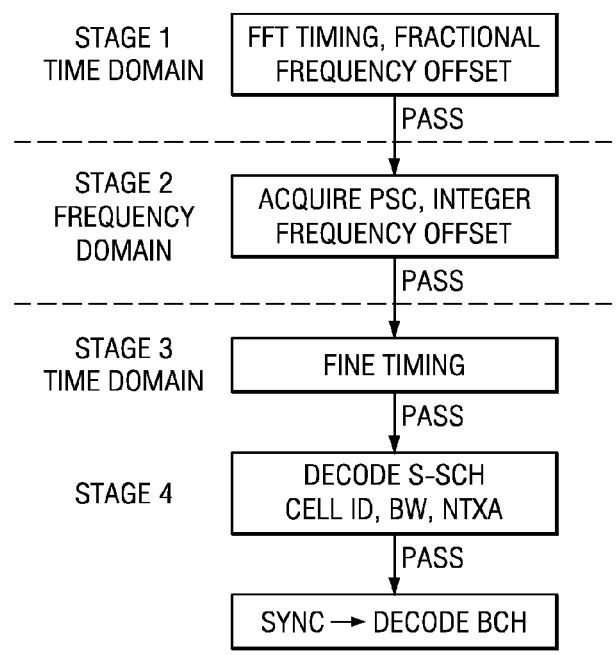
FIG. 7
FIG. 8A
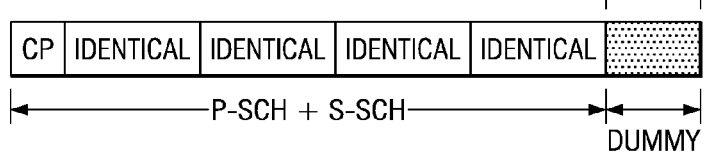

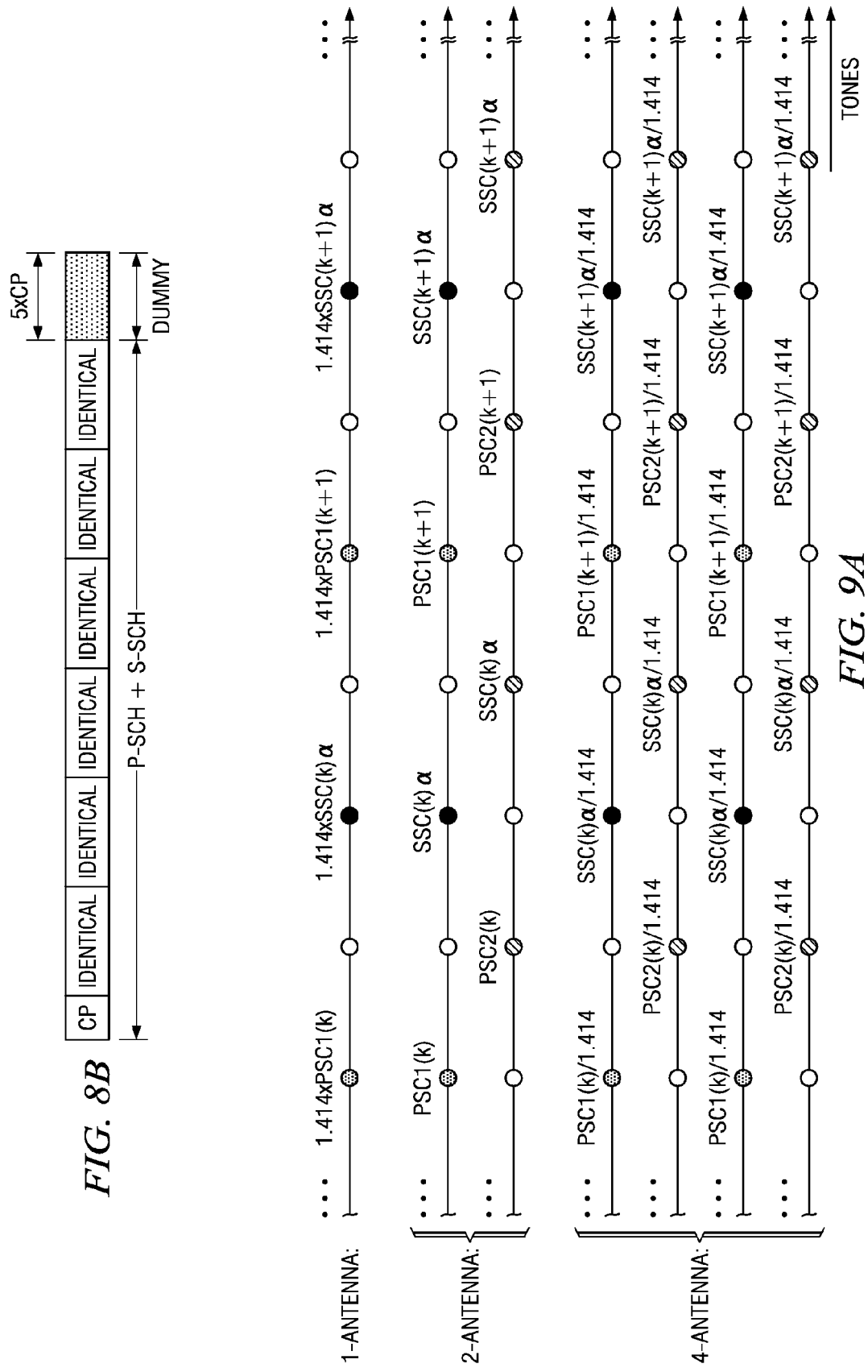

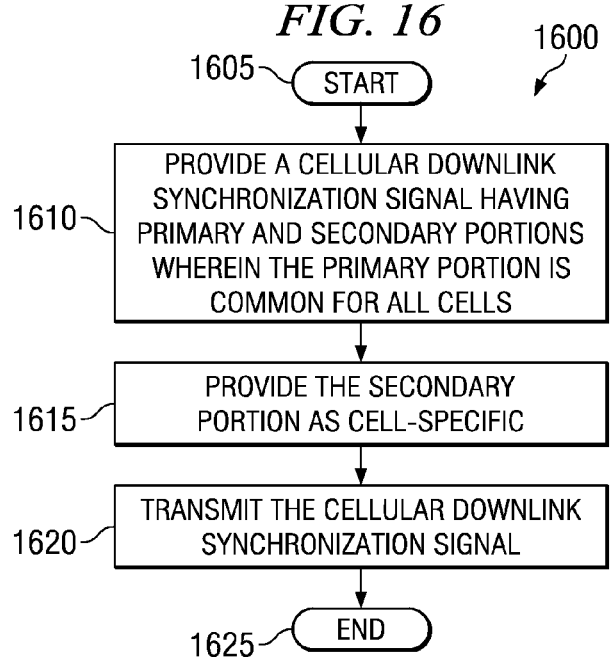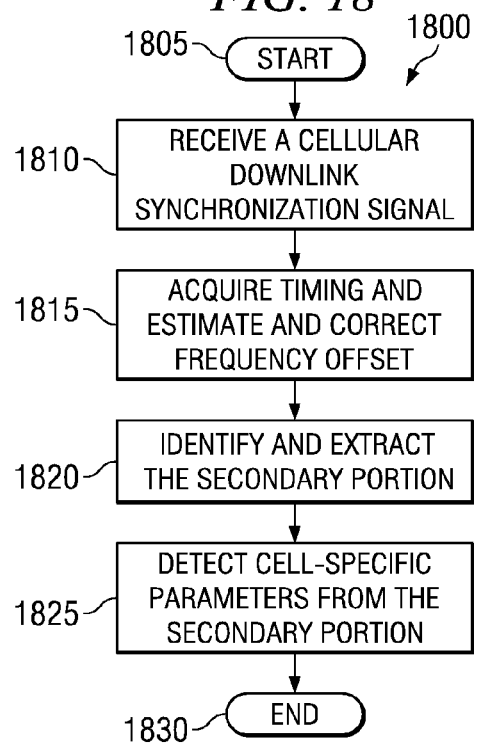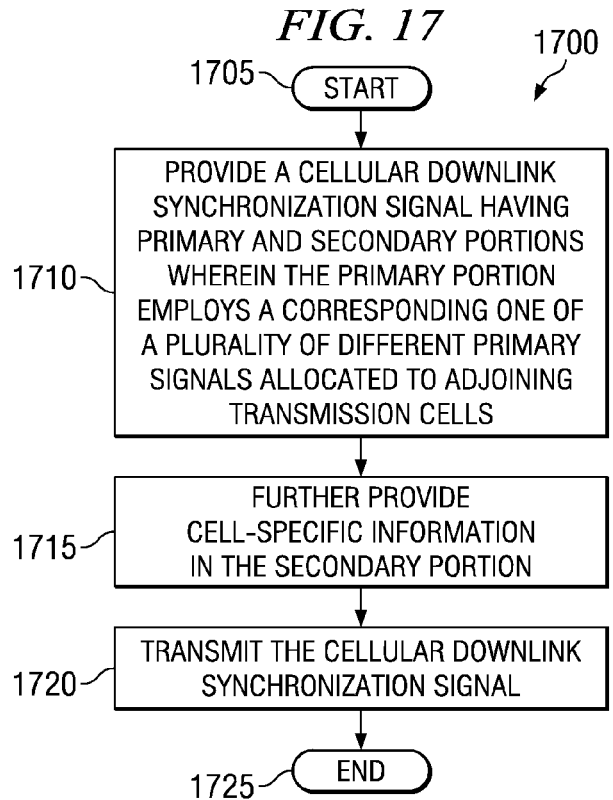

DOWNLINK SYNCHRONIZATION FOR A CELLULAR OFDM COMMUNICATION SYSTEM

CROSS-REFERENCE TO PROVISIONAL APPLICATIONS

This application claims the benefit of U.S. Provisional Application No. 60/701,267 entitled "Downlink Synchronization for E-UTRA" to Eko N. Onggosanusi, Timothy M. Schmidl, Anand G. Dabak and Alan Gatherer, filed on Jul. 21, 2005, which is incorporated herein by reference in its entirety.

Additionally, this application claims the benefit of U.S. Provisional Application No. 60/709,356 entitled "Cellular OFDM Downlink Preamble Design With Antenna Diversity and Configuration Indicator" to Eko N. Onggosanusi, Anand G. Dabak and Timothy M. Schmidl, filed on Aug. 17, 2005, which is incorporated herein by reference in its entirety.

Further, this application claims the benefit of U.S. Provisional Application No. 60/760,031 entitled "Cellular OFDM Downlink Preamble Design With Antenna Diversity and Configuration Indicator" to Eko N. Onggosanusi, Anand G. Dabak, Timothy M. Schmidl and Alan Gatherer, filed on Jan. 18, 2006, which is incorporated herein by reference in its entirety.

Still further, this application claims the benefit of U.S. Provisional Application No. 60/771,229 entitled "Aspects and Design of DL SYNC Channel (SCH) for E-UTRA" to Eko N. Onggosanusi, Anand G. Dabak, Timothy M. Schmidl and Alan Gatherer, filed on Feb. 8, 2006, which is incorporated herein by reference in its entirety.

TECHNICAL FIELD OF THE INVENTION

The present invention is directed, in general, to wireless communications and, more specifically, to transmitters and a receiver, methods of operating a transmitter and a receiver and a cellular communication system employing the transmitters, the receiver and the methods.

BACKGROUND OF THE INVENTION

In a cellular network, such as one employing orthogonal frequency division multiplexing (OFDM) or orthogonal frequency division multiple access (OFDMA), each cell employs a base station that communicates with user equipment, such as a cell phone, a laptop, or a PDA, that is actively located within its cell. When the user equipment is first turned on, it has to do an initial cell search in order to be connected to the cellular network. This involves a downlink synchronization process between the base station and the user equipment wherein the base station sends a synchronization signal to the user equipment.

During initial cell search, the user equipment establishes timing and frequency offset parameters. Timing involves knowing where to sample the start of the synchronization frame and associated symbols. Frequency offset involves determining the mismatch between the controlling oscillator at the base station and the local oscillator in the user equipment.

Depending on the quality of the local oscillator, the frequency offset may be large and require considerable search time as well as additional algorithms to accommodate. This effect is exacerbated if the user equipment is moving at car or train speeds. In addition to timing and frequency considerations, some information that is specific to the initial cell, such as Cell-ID, has to be acquired. Since downlink synchronization involves several operations, the design and procedure of downlink synchronization shall attempt to minimize the receiver complexity and time required for cell search.

As the moving user equipment approaches a cell boundary between two adjoining cells, it performs a neighboring cell search in preparation to handover its activation from the initial cell to the neighboring cell. During this time, it receives information from two or more base stations. Since the base stations typically employ a common synchronization code, this common signal causes a mismatch between the channel experienced by the data transmission and the transmitted synchronization signal for the user equipment thereby resulting in a reduced performance. This phenomenon occurs especially in a tightly synchronized network, such as those deployed in the USA, and has become increasingly popular with medium to large cell radius. While this phenomenon is also relevant to the initial cell search, it is particularly problematic for the neighboring cell search as the operating signal-to-noise ratio (SNR) for the neighboring cell search is considerably lower. This performance reduction translates to larger cell search time, which may result in higher disconnect probability upon handover.

Accordingly, what is needed in the art is an enhanced way to accomplish initial and neighboring cell searches.

SUMMARY OF THE INVENTION

To address the above-discussed deficiencies of the prior art, the present invention provides a base station transmitter for use with an OFDM or OFDMA communication system. In one embodiment, the base station transmitter includes a synchronization unit configured to provide a cellular downlink synchronization signal having primary and secondary portions wherein the primary portion is common for all cells and the secondary portion is cell-specific. Additionally, the base station transmitter also includes a transmit unit configured to transmit the cellular downlink synchronization signal.

In another embodiment, the base station transmitter includes a synchronization unit configured to provide a cellular downlink synchronization signal having primary and secondary portions wherein the primary portion employs a corresponding one of a plurality of different primary signals allocated to adjoining transmission cells and the secondary portion provides cell-specific information. The base station transmitter also includes a transmit unit configured to transmit the cellular downlink synchronization signal.

The present invention also provides a user equipment receiver for use with an OFDM or OFDMA communication system. In one embodiment, the user equipment receiver includes a receive unit configured to receive a cellular downlink synchronization signal having primary and secondary portions wherein the secondary portion provides cell-specific parameters. Additionally, the user equipment receiver also includes a processing unit configured to identify and extract the secondary portion.

In another aspect, the present invention provides a method of operating a base station transmitter for use with an OFDM or OFDMA communication system. In one embodiment, the method includes providing a cellular downlink synchronization signal having primary and secondary portions, wherein the primary portion is common for all cells and the secondary portion is cell-specific and transmitting the cellular downlink synchronization signal.

In another embodiment, the method includes providing a cellular downlink synchronization signal having primary and secondary portions wherein the primary portion employs a corresponding one of a plurality of different primary signals allocated to adjoining transmission cells. The method also includes further providing cell-specific information in the secondary portion and transmitting the cellular downlink synchronization signal.

The present invention also provides a method of operating a user equipment receiver for use with an OFDM or OFDMA communication system. The method includes receiving a cellular downlink synchronization signal having primary and secondary portions wherein the secondary portion provides cell-specific parameters and identifying and extracting the secondary portion.

The present invention also provides, in yet another aspect, a cellular communication system. The cellular communication system includes a manager that allocates a set of primary synchronization codes to a plurality of cells and a centric cellular transmitter that provides a cellular downlink synchronization signal employing one of the primary synchronization codes. The cellular communication system also includes a plurality of adjacent cellular transmitters that provide cellular downlink synchronization signals having corresponding primary synchronization codes that are distinguishable from the one of the primary synchronization codes.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 2A illustrates a synchronization code allocation for a frequency reuse of three;

FIG. 2B illustrates an allocation of a one third portion of the 1.25 MHz SCH bandwidth for a frequency reuse of three within each cell;

FIGS. 3A and 3B illustrate downlink (DL) SYNC preamble formats for Scheme 1;

FIG. 6 illustrates a structure of the time domain S-SCH;

FIG. 7 illustrates a cell search procedure that may be used for Scheme 1;

FIGS. 8A and 8B illustrate exemplary DL SYNC preamble formats for Scheme 2;

FIGS. 9A through 9G illustrate exemplary frequency patterns for Scheme 2;

FIG. 16 illustrates a flow diagram of an embodiment of a method of operating a base station transmitter carried out in accordance with the principles of the present invention;

FIG. 17 illustrates a flow diagram of an alternate embodiment of a method of operating a base station transmitter carried out in accordance with the principles of the present invention; and FIG. 18 illustrates a flow diagram of an embodiment of a method of operating a user equipment receiver carried out in accordance with the principles of the present invention.

DETAILED DESCRIPTION

Figure 1:
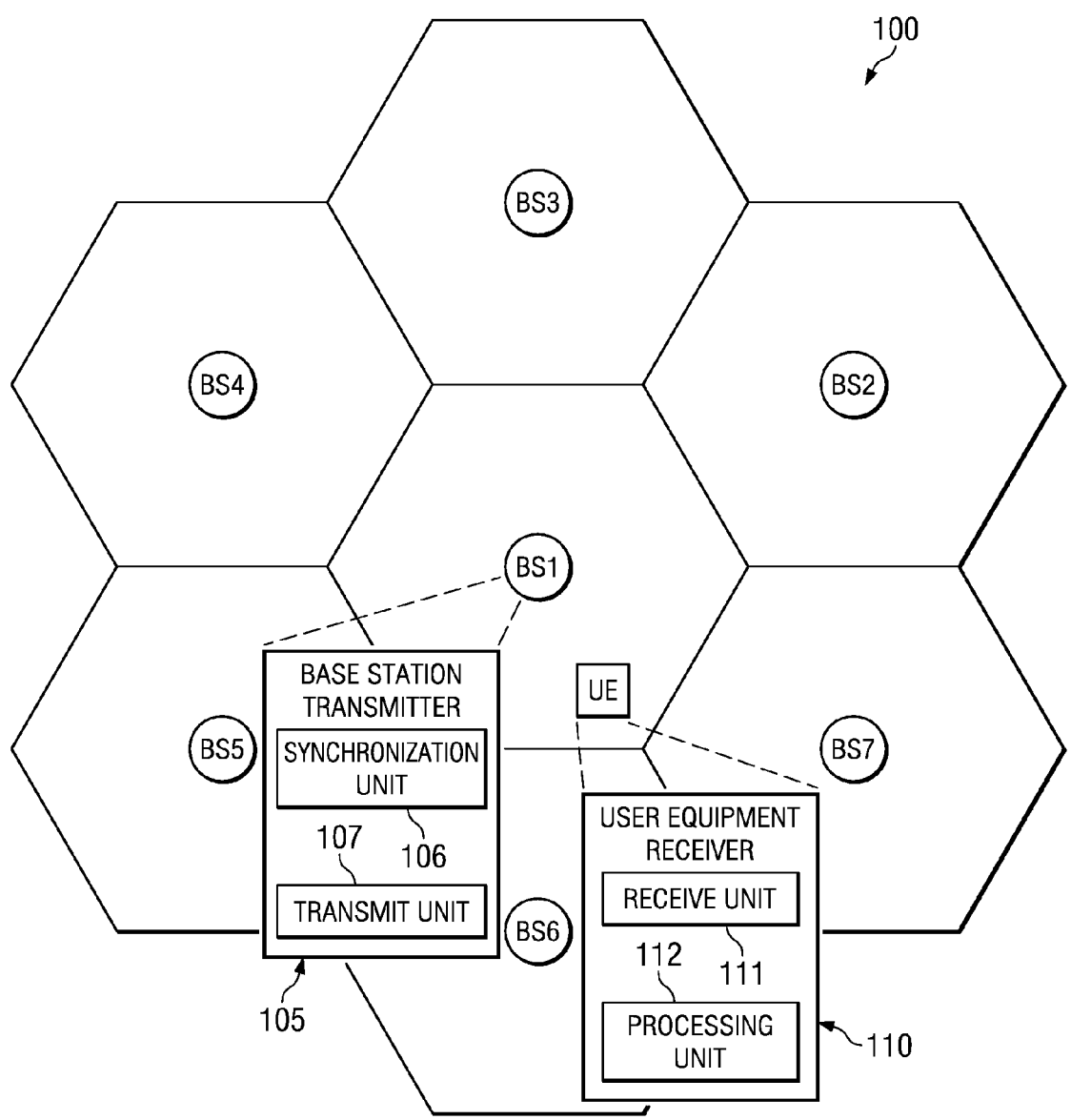
FIG. 1 illustrates a diagram of an embodiment of a cellular network constructed in accordance with the principles of the present invention.

Referring initially to FIG. 1, illustrated is a diagram of an embodiment of a cellular network, generally designated 100, constructed in accordance with the principles of the present invention. The cellular network 100 includes a cellular grid having a centric cell and six surrounding first-tier cells. The centric cell employs a centric base station BS1 and the surrounding first-tier cells employ first tier base stations BS2-BS7, as shown. The cellular network 100 also includes user equipment UE, which is located in the centric cell.

The centric base station BS1 includes a base station transmitter 105 having a synchronization unit 106 and a transmit unit 107. In one embodiment, the synchronization unit 106 is configured to provide a cellular downlink synchronization signal having primary and secondary portions wherein the primary portion is common for all of the cells shown in FIG. 1. However, the secondary portion provides information that is specific to the centric cell (i.e., "cell-specific"). The transmit unit 107 is configured to transmit the cellular downlink synchronization signal to the user equipment UE.

In another embodiment, the synchronization unit 106 is also configured to provide a cellular downlink synchronization signal having primary and secondary portions. However, the primary portion employs one of a plurality of different primary signals, which are respectively allocated to the cells shown in FIG. 1. As before, the secondary portion provides information that is specific to the centric cell and the transmit unit 107 transmits the cellular downlink synchronization signal to the user equipment UE.

The user equipment UE includes a user equipment receiver 110 having a receive unit 111 and a processing unit 112. The receive unit 111 is configured to receive both the primary and secondary portions of the cellular downlink synchronization signal from the base station transmitter 105. The processing unit 112 is configured to identify and extract the secondary portion, which provides cell-specific parameters for the centric cell.

Providing the primary and secondary portions of the cellular downlink synchronization signal allow timing and frequency offset issues to be resolved before cell-specific information is determined. This reduces complexity in initial cell search and handover modes for the user equipment UE. The cell-specific information may also include parameters in addition to Cell-ID, such as the number of transmit antennas and bandwidth employed. The cell-specific information embedded in the secondary portion may be partial or full information. For example, the Cell-ID related information may be the full Cell-ID or a Cell-ID group indicator. Another example is the exact number of transmit antennas or a 1-bit indicator whether the base station employs one or a plurality of transmit antennas. Yet another example is the complete bandwidth indicator or a 1-bit indicator (e.g., whether the bandwidth is above or below a certain range). When only partial information is conveyed in the secondary portion, the full information shall be resolved using some other means. For example, the number of transmit antennas and bandwidth information can be signaled in a broadcast channel that is demodulated by the user equipment upon the completion of the cell search process. Partial Cell-ID can be used to narrow down the detection of the full Cell-ID using the pilot channel. Other cell-specific parameters may also be included in the secondary portion. Some examples are the size of OFDM cyclic prefix and cell configuration.

Since the number of transmit antennas is unknown to the user equipment UE especially during the initial cell search, the UE does not know the number of transmit antennas employed. However, embodiments of the present invention provide benefit from transmitter diversity gain without the receiver having to know the number of transmit antennas. Both lumped and distributed transmission structures are addressed.

Embodiments of an OFDMA-based (cellular) downlink synchronization signal (SCH) employing lumped structures are discussed first. The SCH is carried within a downlink SYNC preamble which is transmitted once every 10 ms frame. As denoted earlier, the SCH includes the primary and secondary portions of SCH (i.e., P-SCH and S-SCH). Two different schemes are addressed, which are based on the manner in which P-SCH and S-SCH are multiplexed. In a first scheme (Scheme 1), the P-SCH and S-SCH are multiplexed in the time domain whereas a second scheme (Scheme 2) employs frequency domain multiplexing. It is demonstrated that multiplexing the P-SCH and S-SCH in the time domain provides the best performance and least complexity.

In advanced cellular OFDMA systems such as the 3GPP long-term evolution (LTE), IEEE 802.16e, and IEEE 802.20, various data transmission bandwidths are supported. For example, 3GPP LTE supports 1.25, 2.5, 5, 10, 15, and 20 MHz data bandwidth. While it is possible for SCH to have the same bandwidth as data, it is certainly not practical as the data transmission bandwidth is unknown during the initial cell search. This, however, may be known during the neighboring cell search. Hence, it is desirable to have as few SCH bandwidths as possible. For instance, within the context of 3GPP LTE the system may assign 1.25 MHz SCH bandwidth for data bandwidth smaller than 5 MHz and 5 MHz SCH bandwidth for data bandwidth larger or equal to 5 MHz. Another alternative is to assign 1.25 MHz SCH bandwidth for all possible data bandwidths. The second alternative is used in the embodiments for illustrative purposes. That is, the SCH occupies a center 1.25 MHz bandwidth, regardless of the data bandwidth However, the invention should also apply to other scenarios where multiple SCH bandwidths are employed as exemplified in the first alternative.

One method given in embodiments of this invention is to allocate different portions of the SCH bandwidth for different sectors within the same site. This is commonly known as frequency reuse. Referring now to FIG. 2A, illustrated is a synchronization code allocation for a frequency reuse of three. The synchronization code allocation for the frequency reuse of three employs PSC(k) and SSC(n,k), which denote a primary synchronization code (PSC) and a secondary synchronization code (SSC) associated with the $k^{th}$ sector of the $n^{th}$ cell, respectively. The frequency reuse of three is employed to prevent several distinct SCHs (employed by different cells) from interfering with one another especially on the cell boundaries which occurs if frequency reuse of one is used.

In FIG. 2A, a frequency reuse of one scenario corresponds to PSC(1)=PSC(2)=PSC(3) and SSC(n,1)=SSC(n,2)=SSC(n,3). Potential problems that may arise with frequency reuse of one include interference among several P-SCHs from different cells. Since the PSC is common to all the cells in the network, the effective channel seen by the PSC is a superposition of the downlink channels from several different base stations. The channel estimate from the P-SCH is used for decoding the S-SCH as well as the broadcast channel (BCH) following the SCH. Since S-SCH and BCH are cell-specific, the channel estimate obtained from the P-SCH does not match with the channel experienced by the S-SCH and BCH. This becomes more severe for the user equipment UE near the cell boundaries (as indicated by the black X in FIG. 2A).

Interference among several S-SCHs from different cells essentially lowers the SNR for SSC decoding, especially for the user equipment UE on the cell boundaries and therefore increases the time required to decode the SSC. Furthermore, in the event when the user equipment UE receives several (e.g., two or three) equally strong signals from several base stations, averaging across multiple frames will not efficiently suppress the interference since the interfering signals does not significantly change across frames. Therefore it will be difficult to reliably decode the SSC from the serving cell.

Referring to FIG. 2B, illustrated is an allocation of a one third portion of the 1.25 MHz SCH bandwidth for a frequency reuse of three within each cell. The SCH orthogonality across sectors within a cell avoids the possibility of SCH collisions for user equipment UE on the sector and cell boundaries as illustrated in FIG. 2A. It also increases the operational SNR for cell search by reducing other-cell interference. Additionally, localized tone allocation is depicted in FIG. 2B. While distributed tone allocation may also be employed, localized tone allocation is superior for several stages in the cell search process that involve frequency domain processing. This occurs mainly because the channel does not vary significantly in frequency within one localized allocation unit, which is beneficial when the channel is unknown. However, this is not the case for a distributed tone allocation.

It should be noted that while a frequency reuse of three for SCH is one technique suggested in this invention, other embodiments of this invention do not necessitate employing frequency reuse. For instance, a frequency reuse of one (i.e. no frequency reuse) is also applicable.

Referring now to FIGS. 3A and 3B and FIGS. 4A, 4B and 4C, illustrated are exemplary downlink (DL) SYNC preamble formats and frequency patterns for Scheme 1, respectively. The SCH is embedded in the DL SYNC preamble, which is transmitted once every frame. In terms of the basic functions, the P-SCH is used to provide timing and frequency locks, and the S-SCH points to the Cell-ID and possibly other cell-specific parameters In FIGS. 3A and 3B, preamble lengths of five and six OFDM symbols are shown, respectively, where the aforementioned OFDM symbols are lumped at one location. In the context of 3GPP LTE with 10-ms frame length, this provides a 3.57% and 4.29% overhead for the 1.25 MHz data bandwidth and selected DL numerology. For higher data bandwidth, the overhead decreases proportionally. For example, for a 5 MHz data bandwidth, the corresponding overhead is 0.89% and 1.07% for five and six symbol preamble lengths. As the preamble lengths are exemplary, the exact number of P-SCH and S-SCH symbols may be varied without departing from the scope of this invention.

Figure 4A:
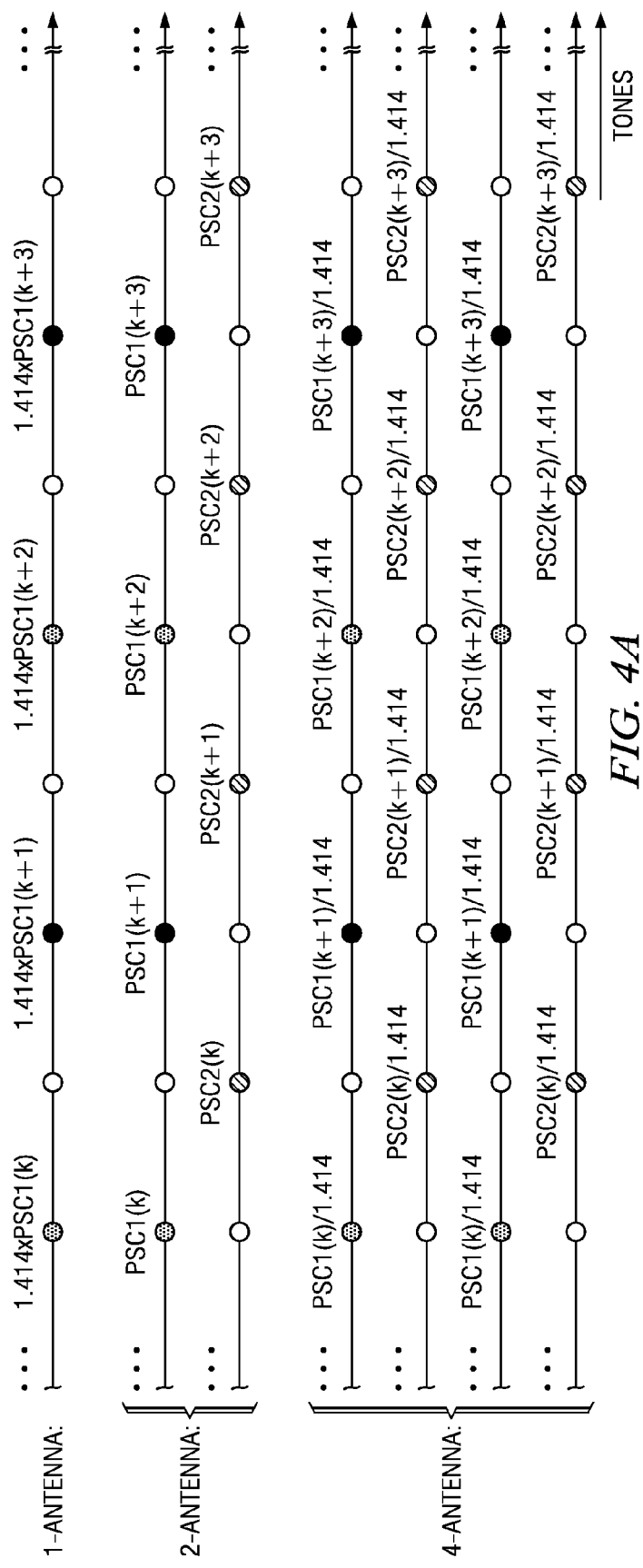
FIGS. 4A, 4B and 4C illustrate frequency patterns for Scheme 1.

The P-SCH and S-SCH are time multiplexed and have the following functions. The P-SCH carries primary synchronization codes (PSC1 and PSC2) in the frequency domain as depicted in FIG. 4A and is used for timing and frequency acquisition. This structure ensures an antenna diversity gain of two for two and four antenna transmissions. In the illustrated embodiment, the PSCs are common to all the cells. When a frequency reuse of three is employed, the P-SCH associated with different sectors (from the same or different cells) are orthogonal due to the frequency reuse pattern depicted in FIG. 2B although the codes are common to all the three sectors within a cell.

With frequency reuse of three, the length of each of the PSCs is NU/6 where NU is the number of used sub-carriers. For a single antenna transmitter, PSC2 is not used. This allows the S-SCH to obtain channel estimates from the P-SCH by always assuming a two antenna transmission. For a four antenna transmitter, power balancing is used so that each of the PSCs only sees one channel (PSC1 sees H1+H3 and PSC2 sees H2+H4). An antenna diversity of two is experienced by two and four antenna transmitters. The P-SCH contains four identical OFDM head symbols. This four-time repetition structure facilitates FFT timing acquisition and fractional frequency offset estimation using a well-known differential auto-correlation method.

Figure 4B:
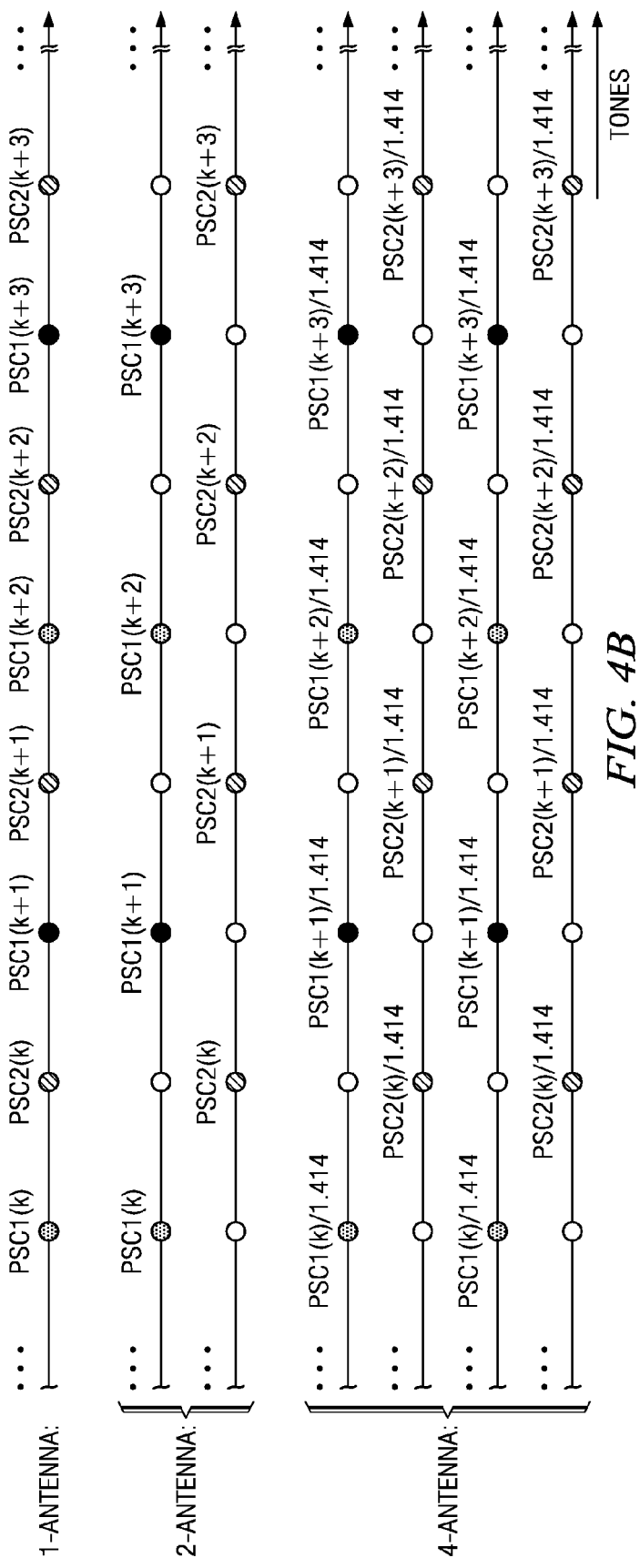
Figure 4C:
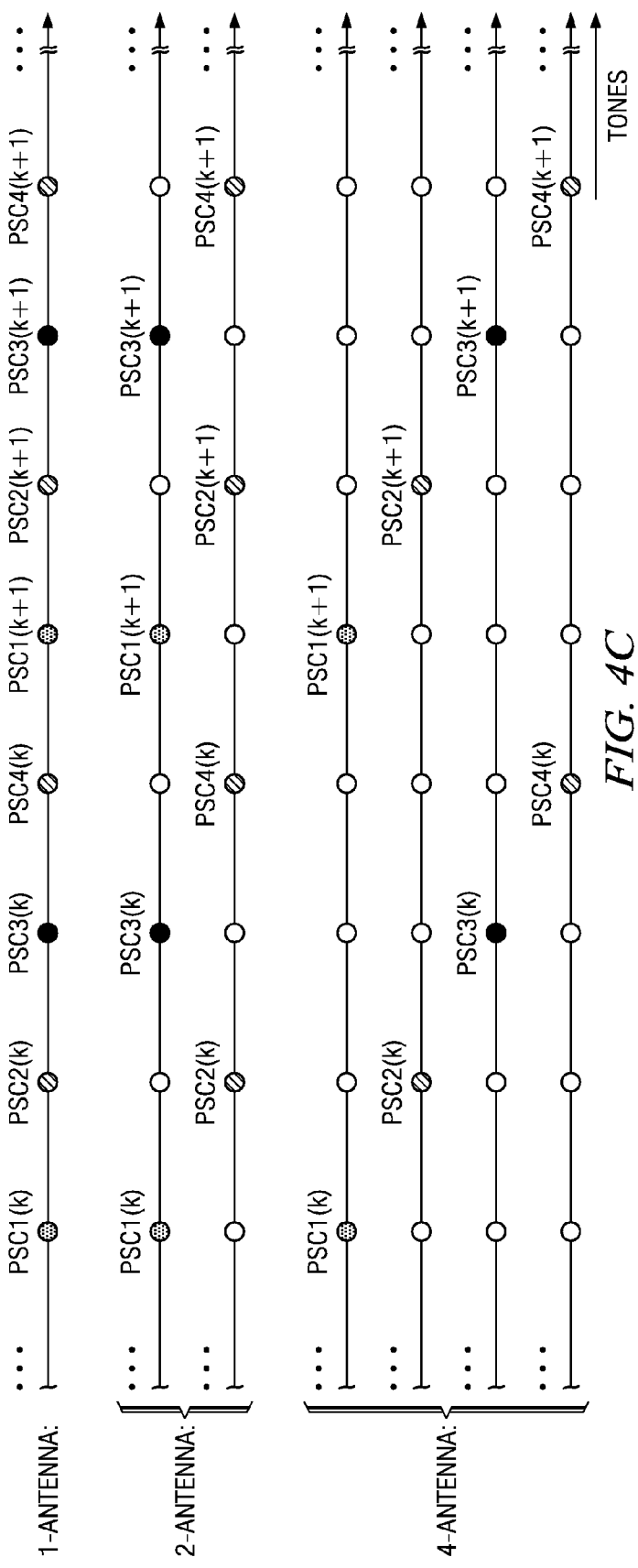

Other embodiments for the frequency domain structure of the P-SCH are given in FIGS. 4B and 4C. Comparing FIG. 4B to FIG. 4A, both PSC1 and PSC2 are also used for the single-antenna transmission in FIG. 4B. Another alternative depicted in FIG. 4C employs 4 PSCs to attain full diversity for the 4-antenna transmission. Other structures can also be chosen by someone familiar with the art without departing from the scope of this invention. The essence of the different embodiments lies in the feature that allows the system to attain transmit diversity gain for SCH while the UE receiver is oblivious to the number of transmit antennas.

Figure 5:
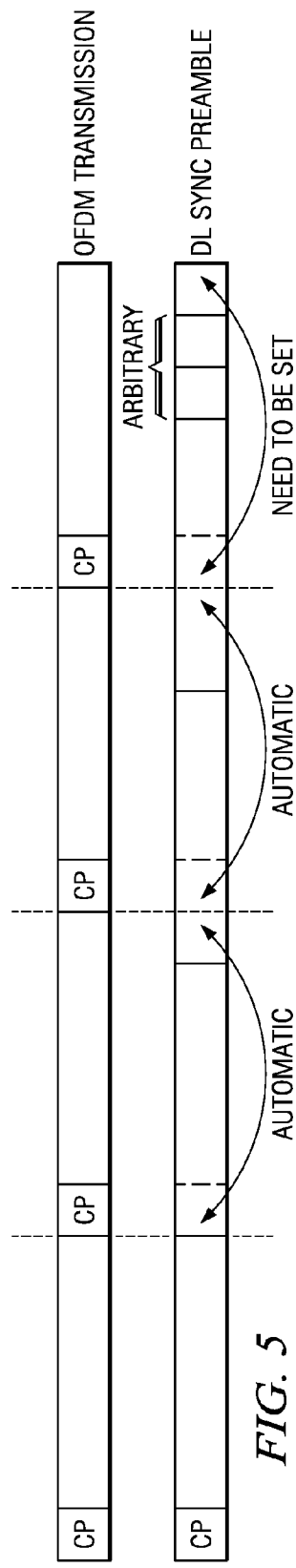
FIG. 5 illustrates a four-time repetitive setup of a preamble.

As depicted in FIGS. 3A and 3B, the cyclic prefixes (CPs) for the last three symbols are grouped as a dummy field. Referring to FIG. 5, illustrated is a four-time repetitive setup of a preamble, except for the last symbol that contains a dummy field. To allow proper frequency domain multiplexing between the SCH and other channels, the downlink SYNC preamble format maintains the structure of a regular OFDM transmission. Fortunately the last NCP samples in the dummy field may be set equal to the first NCP samples of the preamble head symbol, as seen in FIG. 5. This ensures that the SCH can be properly multiplexed with other channels in the frequency domain.

Referring now to FIG. 6, illustrated is an exemplary structure of the time domain S-SCH. The S-SCH carries the full cell ID (which points to the cell-specific scrambling code), the number of transmit antennas information, and the size of the data bandwidth. Each of the code words associated with the 9-bit cell ID maps onto one of the 512 available scrambling codes. Depending on the length of the S-SCH (i.e., either one or two OFDM symbols per preamble), the payload is transmitted over either two or one frames, respectively. To fit the resulting encoded data bits into two OFDM symbols, a rate 5/24 coding derived from rate 1/5, K=7 maximum d-free convolutional code is employed as is interleaving. In general, any forward error correcting code (FEC) other than convolutional code can be employed (e.g., block code, Turbo code).

In FIG. 6, the S-SCH employs space-frequency transmit diversity (SFTD, which is also known as frequency-domain Alamouti code) encoding for a two or four antenna transmitter. Since the number of antennas is not known before S-SCH is decoded, the receiving UE always assumes that SFTD encoding is done at the transmitting base station. As mentioned, the S-SCH obtains the channel estimates for SFTD decoding from the P-SCH. In the case of a single antenna transmission, the channel estimates obtained for antenna two are small and therefore do not result in significant degradation. Other transmit diversity schemes may also be employed such as delay diversity, cyclic delay diversity, time switched time diversity, and phase switched transmit diversity.

Referring now to FIG. 7, illustrated is a cell search procedure that can be used for Scheme 1. In Stage 1, a differential auto-correlation is employed with a correlation length equal to half of the P-SCH length and having a valid timing range (for a width equal to the CP length) extended by plus or minus one OFDM symbol. In Stage 2, correlation with the PSCs and non-coherent combining across the PSCs in the frequency domain and receive antennas are performed to detect the integer frequency offset. This step is only applicable when the frequency offset is sufficiently large to cause more than one rotation. In Stage 3, a correlation in the time domain with the P-SCH part of the preamble is performed. In Stage 4, demodulation, de-interleaving, and FEC decoding are performed to extract the cell-specific parameters.

Referring now to FIGS. 8A and 8B and FIGS. 9A through 9G, illustrated are an exemplary lumped DL SYNC preamble format and frequency patterns for Scheme 2, respectively. In FIGS. 8A and 8B, two preamble lengths of four and six OFDM symbols are given. In the context of 3GPP LTE, this amounts to 2.86% and 4.29% overheads for a 1.25 MHz data bandwidth and selected DL numerology. For higher data bandwidth, the overhead decreases proportionally. For example, for a 5 MHz data bandwidth, the corresponding overhead is 0.71% and 1.07% for four and six symbol long preambles. Note that an even number of OFDM symbols are needed to construct SCH with frequency domain (FD) S-SCH. This is because of the differential auto-correlation algorithm employed in the FFT timing detection.

The P-SCH (which carries PSC1 and PSC2) and S-SCH (which carries SSC) are frequency multiplexed and the SCH carries PSC1, PSC2, and SSC in the frequency domain as depicted in FIG. 9A. The length of each code is NU/12 (half of that as for Scheme 1). Therefore, the energy carried by the P-SCH in Scheme 2 is half of that carried in Scheme 1. Transmitting a half set of tones for the one antenna transmitter and power balancing for the four antenna transmitter of Scheme 2 are similar to Scheme 1. This structure ensures antenna diversity gain of two for two and four antenna transmissions.

Figure 9B:
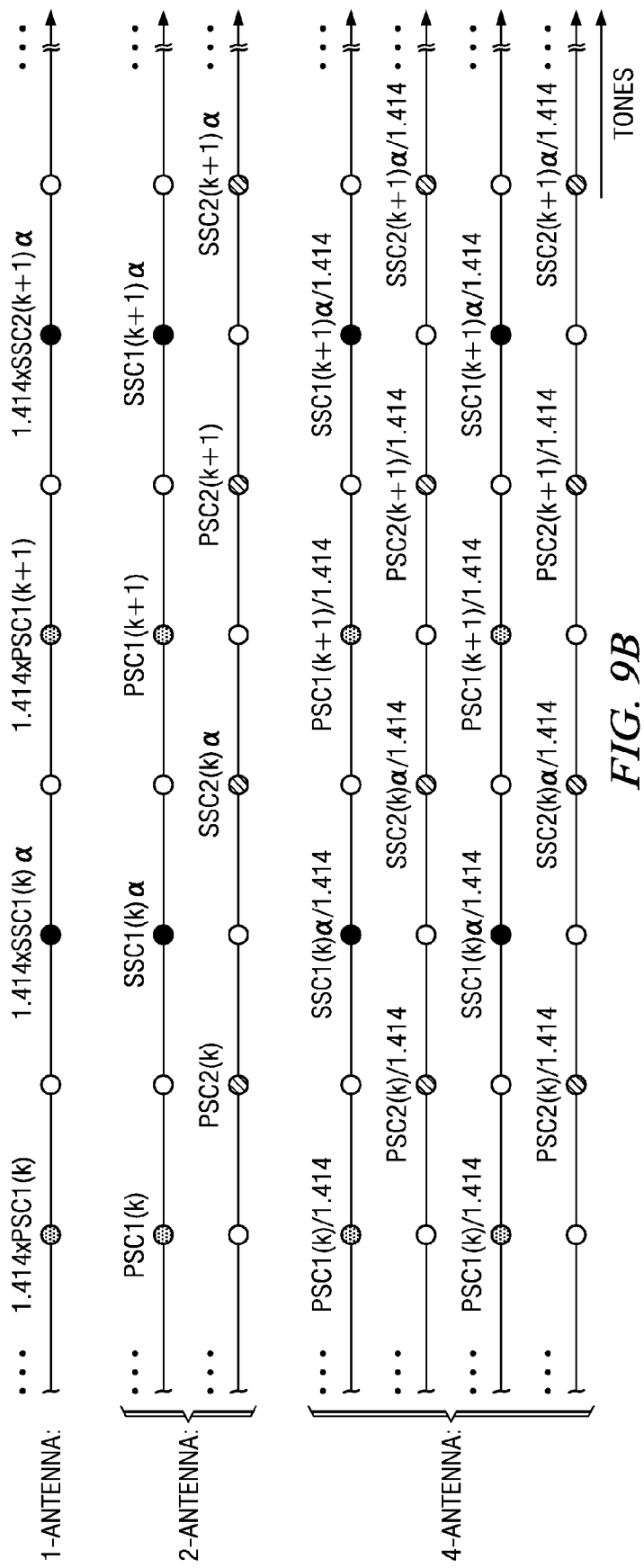
Figure 9C:
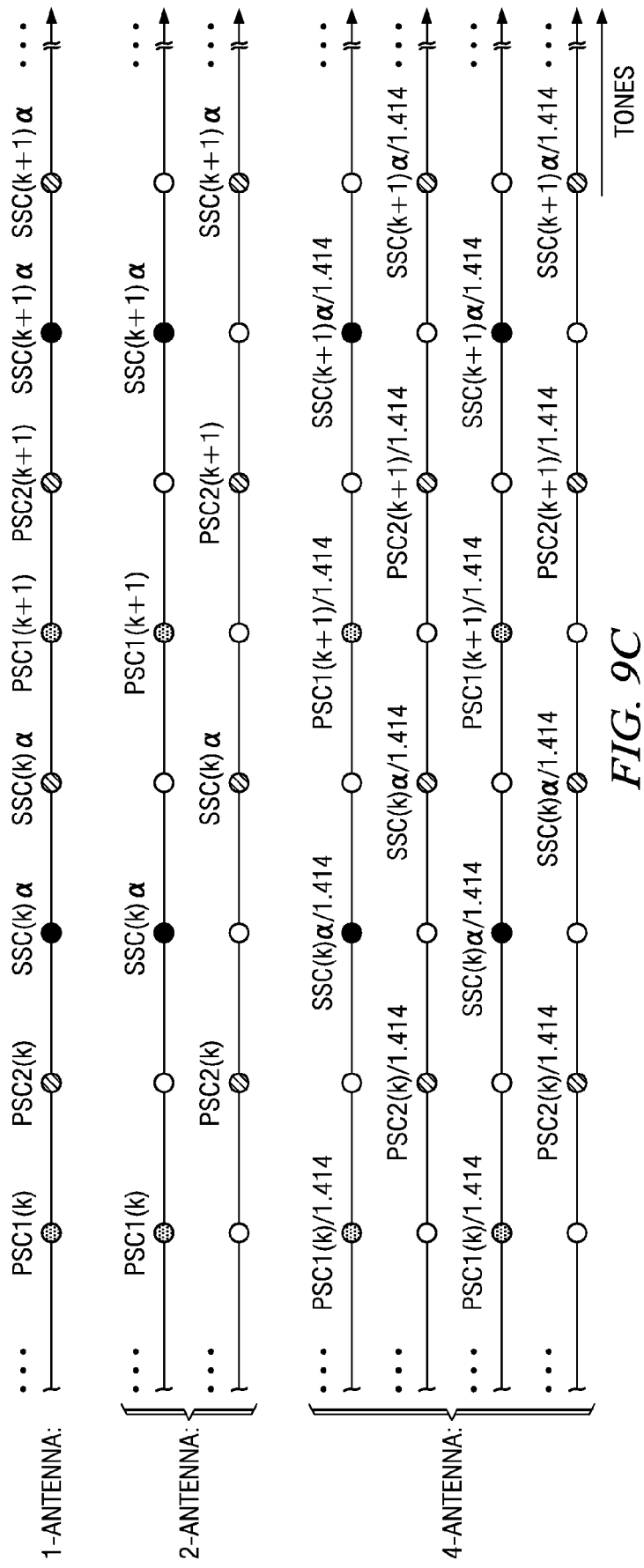
Figure 9D:
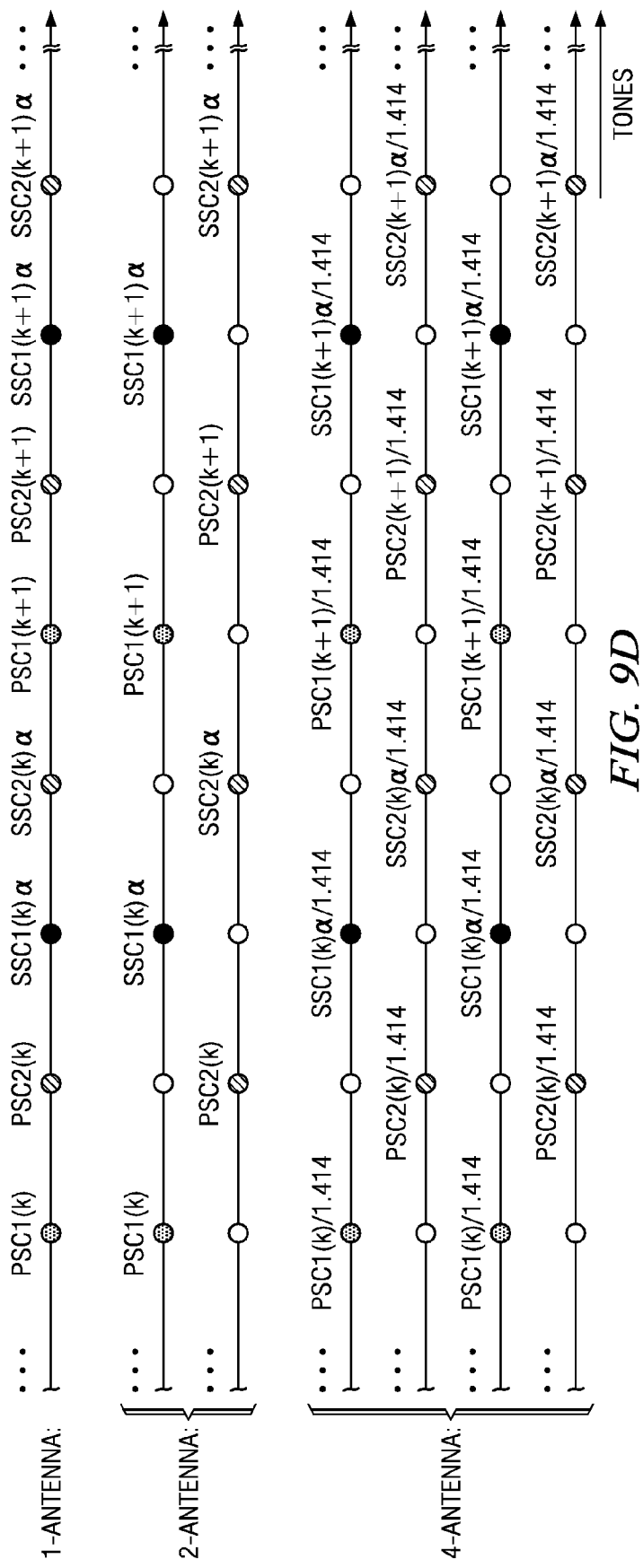
Figure 9E:
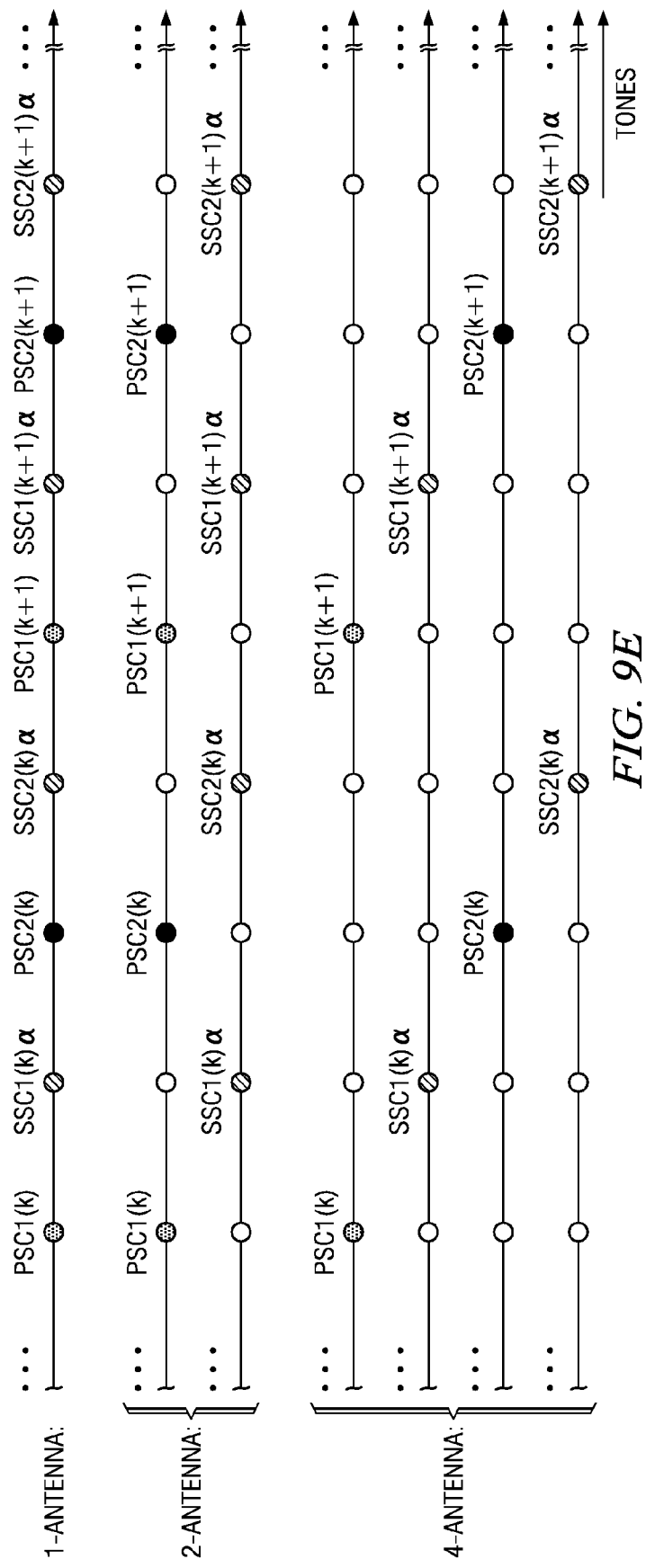
Figure 9F:
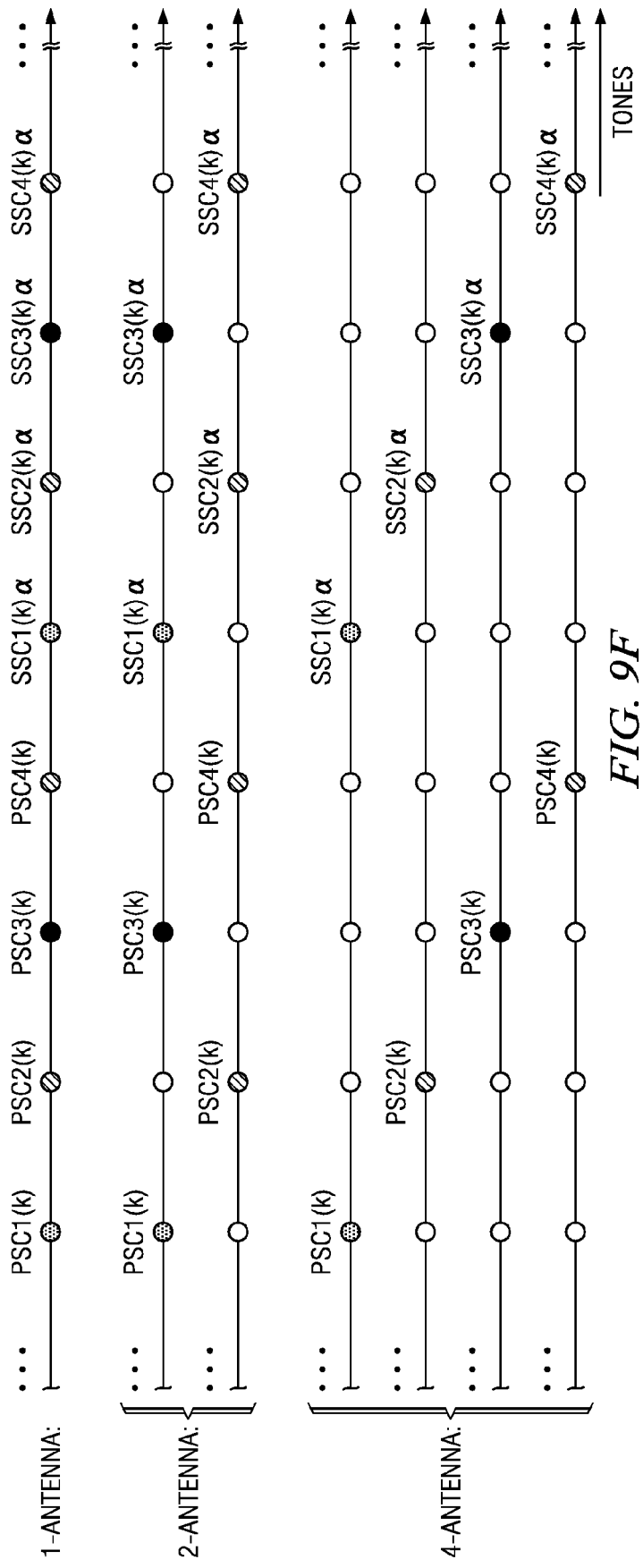
Figure 9G:
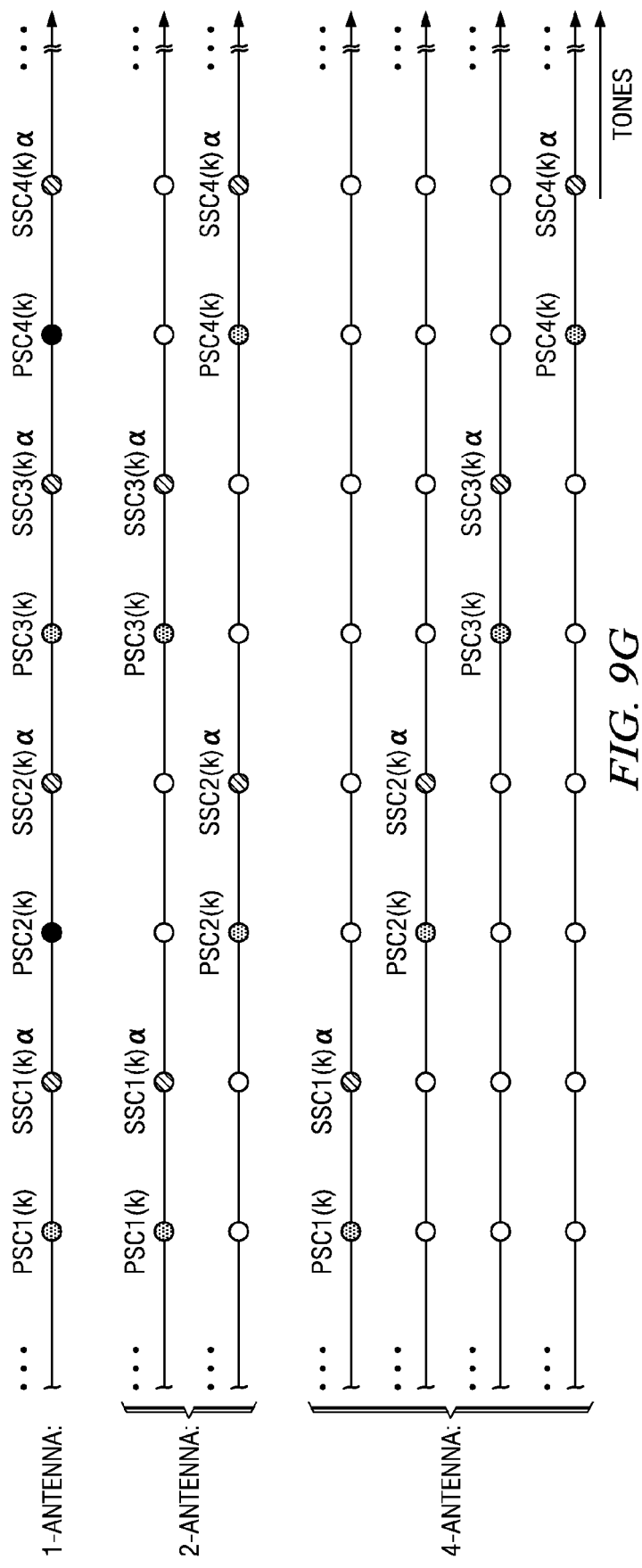

Other embodiments for the frequency domain structure are given in FIGS. 9B to 9G. The structure in FIG. 9B is simply a variation of FIG. 9A where two distinct SSCs are employed instead of one. FIGS. 9C and 9D depict two structures (see for example, FIGS. 9A and 9B) where PSC2 is also used in a one antenna transmission. The structure in FIG. 9E interleaves the primary and secondary synchronization codes. Analogous to the previous embodiments, SSC1 and SSC2 may be identical or distinct. FIG. 9F depicts a structure with four primary and secondary codes. This structure attains full antenna diversity for a four antenna transmission at the expense of shorter code length. Analogous to the previous embodiments, the SSCs may be identical or distinct. Yet another embodiment is depicted in FIG. 9G where four codes are used but the PSCs and SSCs are paired. One skilled in the pertinent art may choose other structures without departing from the scope of the invention. One possible variation is to employ one of the structures in FIGS. 9A to 9G without the use of a scaling factor α. That is, a may be set to 1 for different number of transmit antennas. Yet another possible variation is to adopt the structure given in FIG. 9E for 1-antenna for the 2-antenna and 4-antenna transmissions, and in conjunction employ an antenna transmit diversity scheme (e.g., time switched transmit diversity or cyclic delay diversity). In this case, the distinct PSC1 and PSC2 can be considered as two parts of a single PSC code. The same applies to SSC1 and SSC2. Any combination of different variations shall also be within the scope of the invention. The essence of the different embodiments lies in the ability of the system to attain transmit diversity gain for SCH while the UE receiver remains oblivious to the number of transmit antennas.

A capability to detect the number of transmit antennas is provided using the scaling factor α, where:

$$\alpha = \begin{cases} 1, & NTXA = 1 \\ \exp\left(j\frac{2\pi}{3}\right), & NTXA = 2 \\ \exp\left(j\frac{4\pi}{3}\right), & NTXA = 4 \end{cases} \quad (1)$$

Hence, detecting the scaling factor α amounts to detecting the number of transmit antennas. This detection is performed after SSC detection. Since α only involves phase, it can be detected by comparing the secondary portion of the received synchronization signal with the channel estimate obtained from the primary portion. This method is accurate since the frequency-domain channel experienced by the primary portion is close to that experienced by the secondary portion. The comparison may be performed by correlating the secondary portion with the SSC and the channel estimate obtained from the primary portion, followed by some averaging. The resulting metric contains the phase of α which can be extracted to determine the number of transmit antennas.

The SSC points to the group of the cell-specific scrambling code. The amount of information that can be carried by the SSC depends on its length. Hence, if the SSC is not long enough to carry the full cell-ID information, it can carry only the partial cell-ID information such as the cell-ID group.

Figure 10:
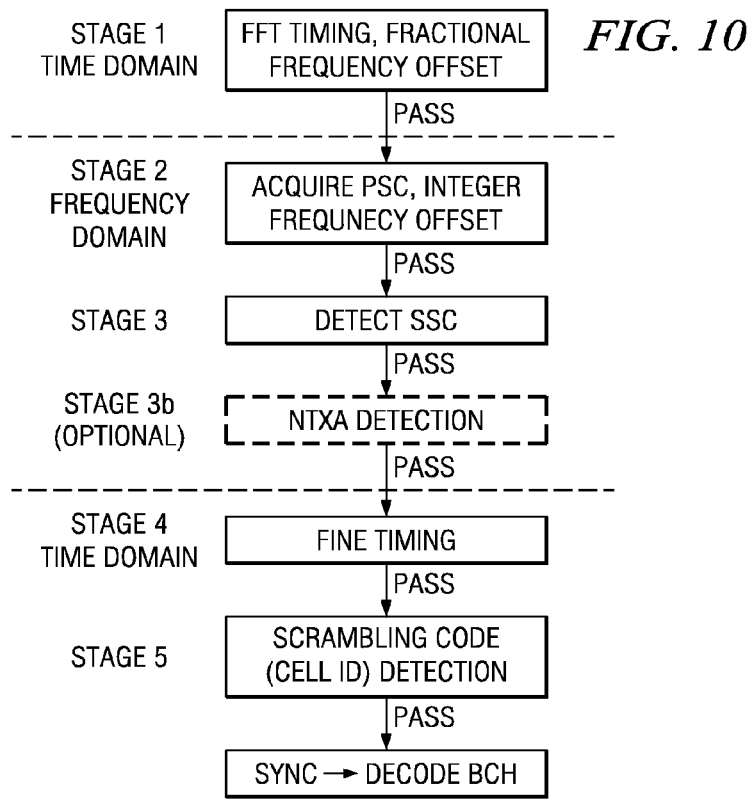
FIG. 10 illustrates a cell search procedure that may be used for Scheme 2.

Referring now to FIG. 10, illustrated is a cell search procedure that can be used for Scheme 2. In Stage 1, a differential auto-correlation with correlation length equal to half of the preamble length having a valid timing range (where width is equal to CP length) extended by plus or minus one OFDM symbol is employed. In Stage 2, correlation with the PSCs and non-coherent combining across PSCs and RX antennas is performed. In Stage 3, correlation with the SSC candidates is employed and an optional correlation of channel estimates from the PSC and SSC along with three-value hypothesis testing may be employed. In Stage 4, correlation in time domain with the whole DL SYNC preamble is performed. Stage 5 provides scrambling code detection if the number of scrambling codes is greater than the number of candidate SSCs.

Compared to Scheme 1, Scheme 2 requires additional stages for detecting the SSC and the scrambling code, as well as for detecting the data bandwidth and the number of transmit antennas. For scheme 1, those parameters can be obtained from decoding the S-SCH. Therefore, Scheme 1 results in a less complex cell search procedure.

Referring now to FIGS. 11A through 11G, illustrated are simulation results that compare performances of Scheme 1 and Scheme 2 within the context of 3GPP LTE. Simulation assumptions are given in Table 1, below. Each stage in the cell search procedure is simulated and the corresponding detection error rate is plotted against SNR. Each scheme is evaluated based on the number of frames required to attain a 1% detection error rate at −10 dB SNR. While this criterion may not be normative, it ensures sufficiently high detection accuracy on each stage.

For Scheme 1, all the cell search stages are simulated. For Scheme 2, the bandwidth detection and scrambling code detection stages are not simulated.

TABLE 1

| Simulation Assumptions | |
|---|---|
| Parameter | Assumption |
| Channel Model | TU, 3 kmph, 2 GHz center frequency |
| Antenna Configuration | 1, 2, and 4 at TX (Node B) |
|  | 2 at RX (UE) |
| Spatial channel | Uncorrelated |
| SNR definition | SNR per sample in 1 OFDM symbol |

Each stage is simulated with a different number of averaging frames. The target detection error rate is set to one % and the number of frames that is required to operate at less than or equal to −10 dB SNR is determined. Simulation of each of the schemes with different numbers of transmit antennas is also provided.

FIGS. 11A-11D depict the performance of Stages 1-4 for Scheme 1 (TD S-SCH) with 5 OFDM symbols. For stage 4 (S-SCH decoding) the channel estimates are obtained from P-SCH and the UE always assumes a two antenna transmission with SFTD encoding. Also, since the S-SCH is transmitted over two frames, the UE uses the right ordering (frame 1 to frame 2 vs. frame 2 to frame 1) when decoding the S-SCH across two frames.

Figure 11A:
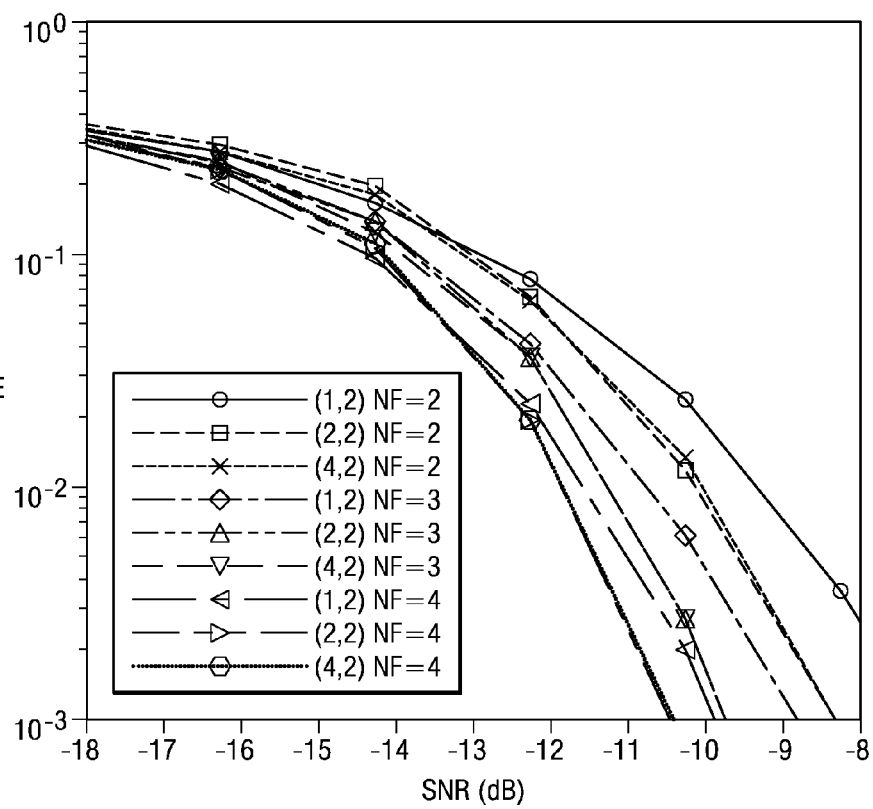
FIGS. 11A through 11G illustrate simulation results that compare performances of Scheme 1 and Scheme 2 within the context of 3GPP LTE.
Figure 11B:
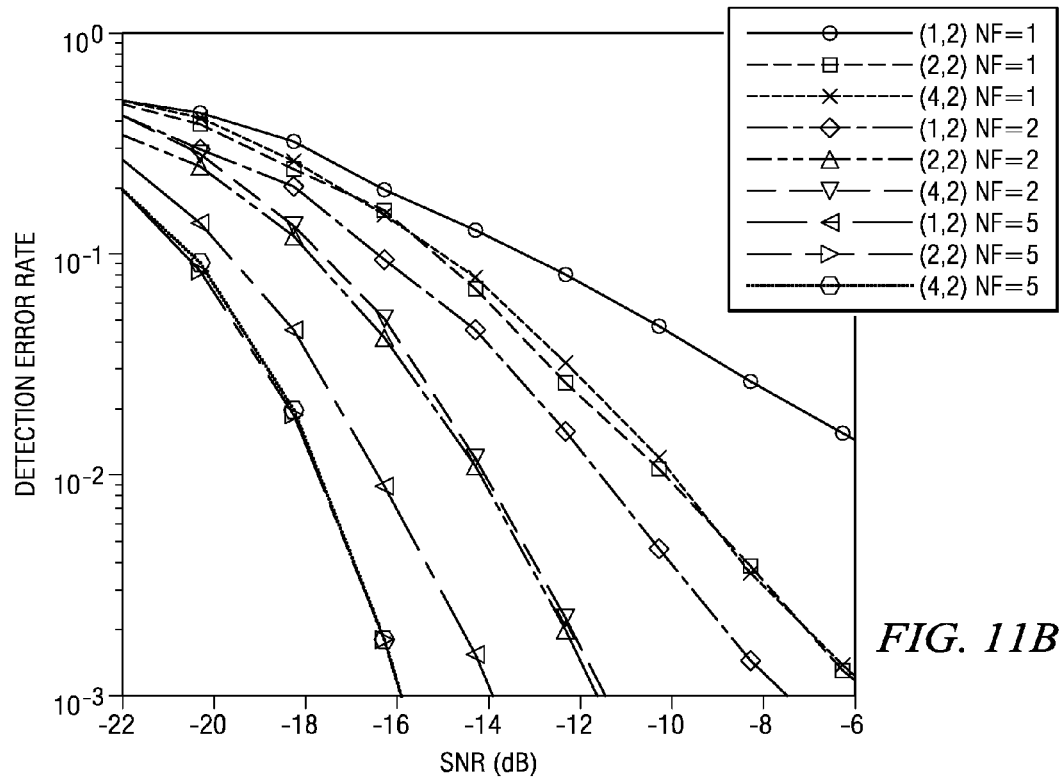
Figure 11C:
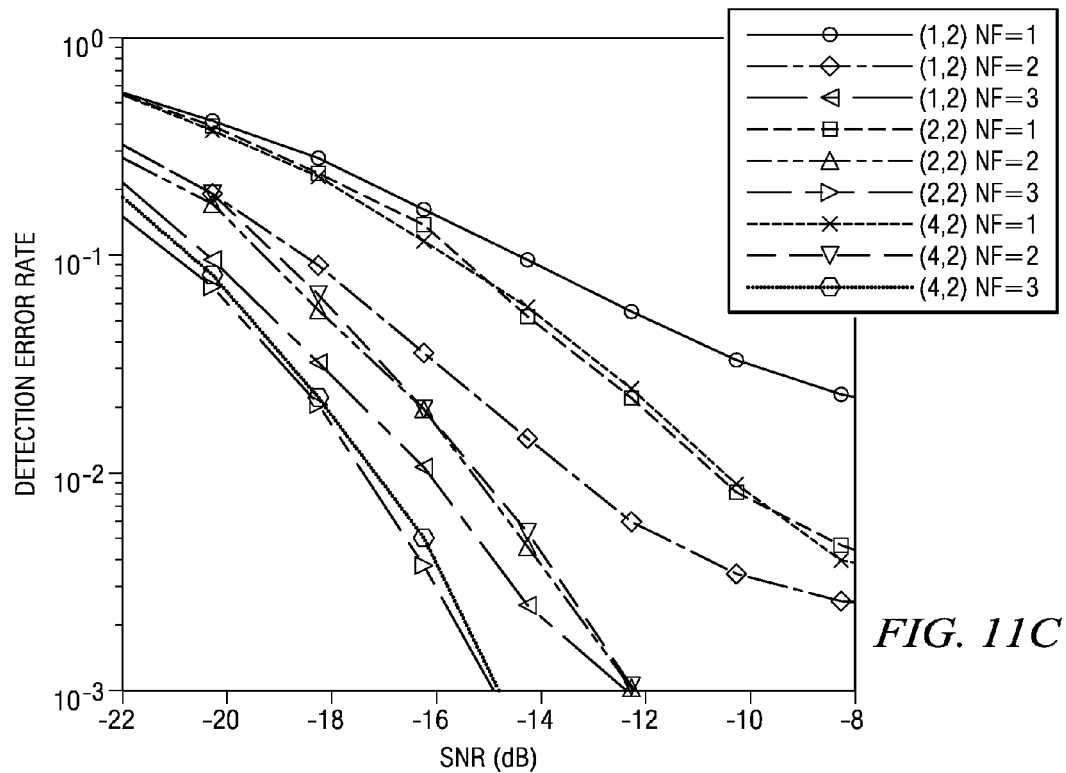
Figure 11D:
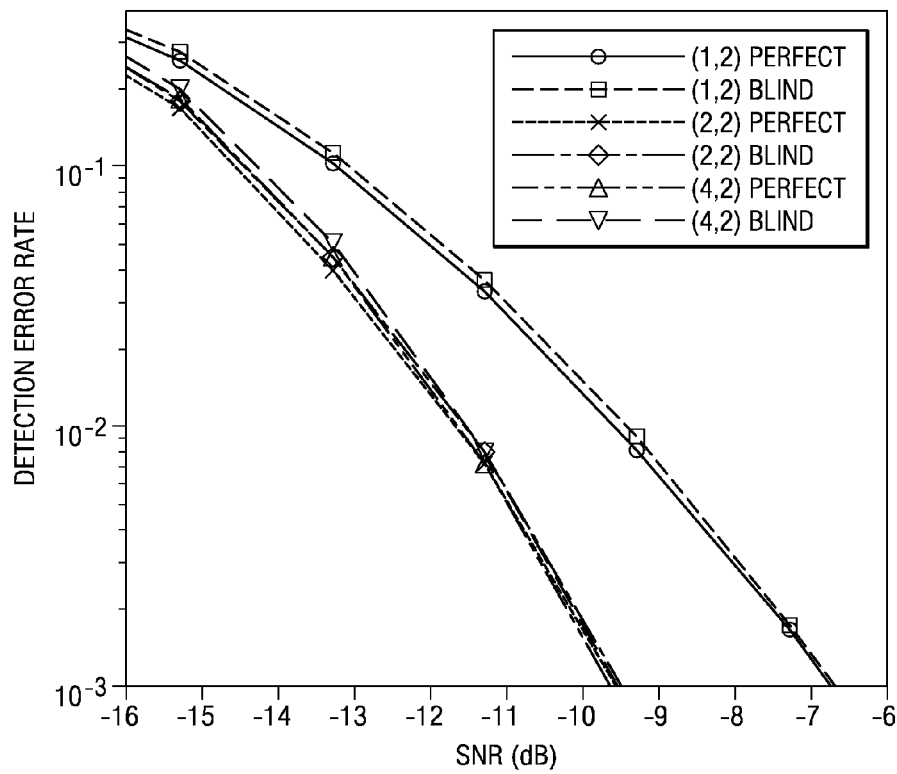

In FIG. 11D, the performance of decoding the cell ID is shown employing perfect knowledge as well as blind decoding. With blind decoding, the TD S-SCH is decoded twice (frame 1 to frame 2 and frame 2 to frame 1) and the right ordering is chosen to be the one that results in the maximum Viterbi metric. Observe that decoding over two frames gives sufficient performance for each detection. If better performance is desired, soft or Chase combining across more than two frames can also be used.

The required number of frames for each stage is as follows:
Stage 1 (FFT timing): 2-3 frames,
Stage 2 (PSC & integer offset): 1-2 frames,
Stage 3 (fine timing): 1-2 frames, and
Stage 4 (S-SCH): 2 frames.

This gives a total of 6-9 frames to complete one initial cell search process.

4.3. Scheme 2 (FD S-SCH) with 4 OFDM Symbols

Figure 11E:
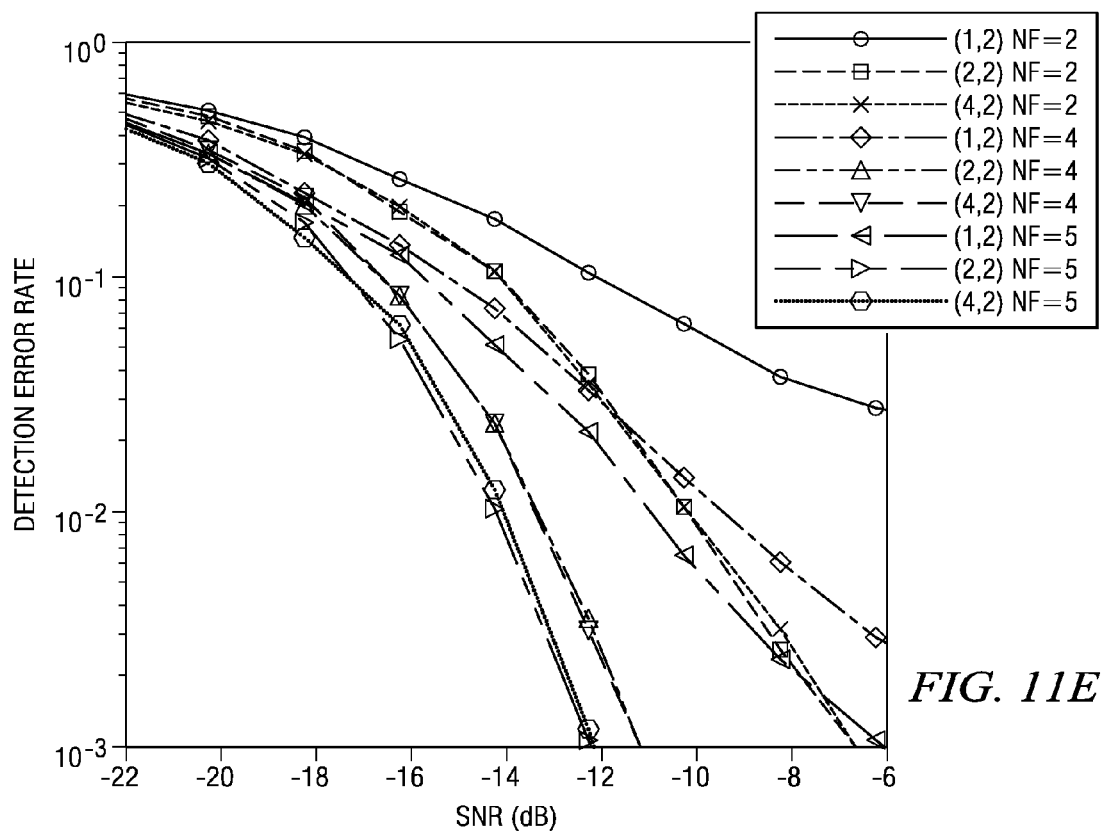
Figure 11F:
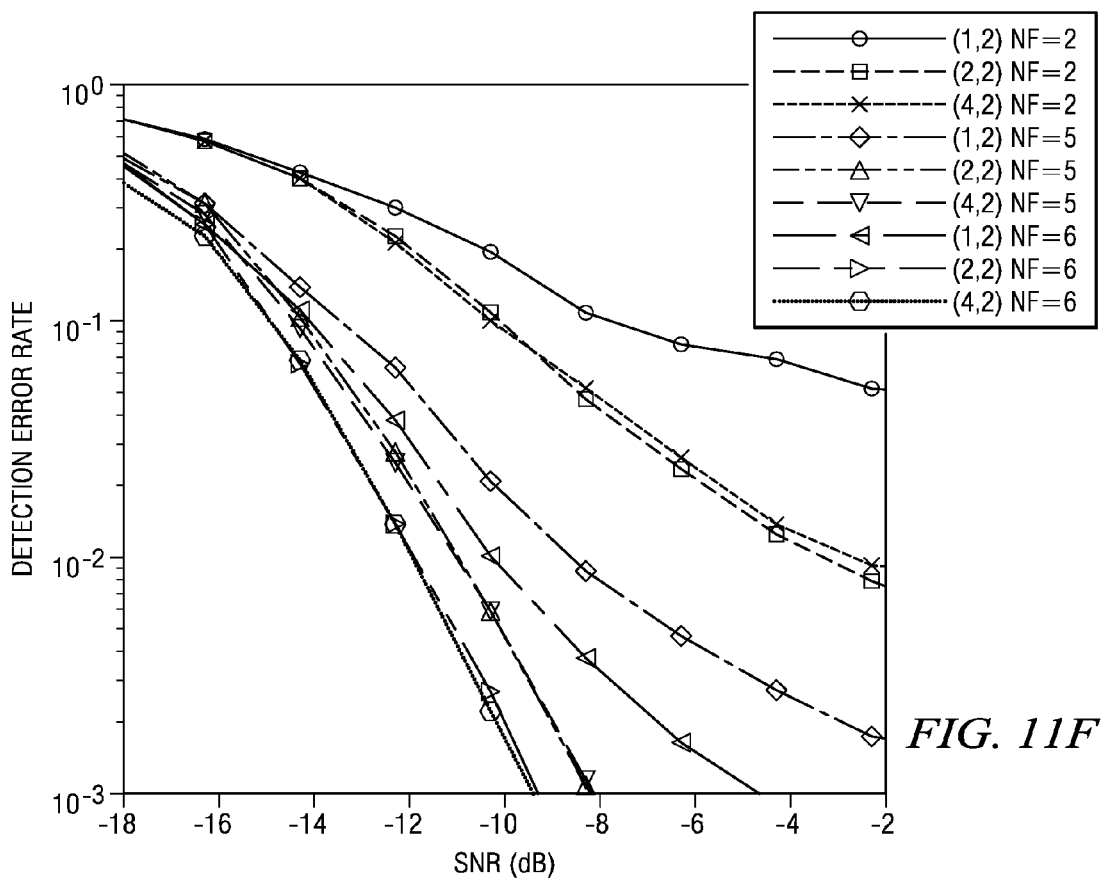
Figure 11G:
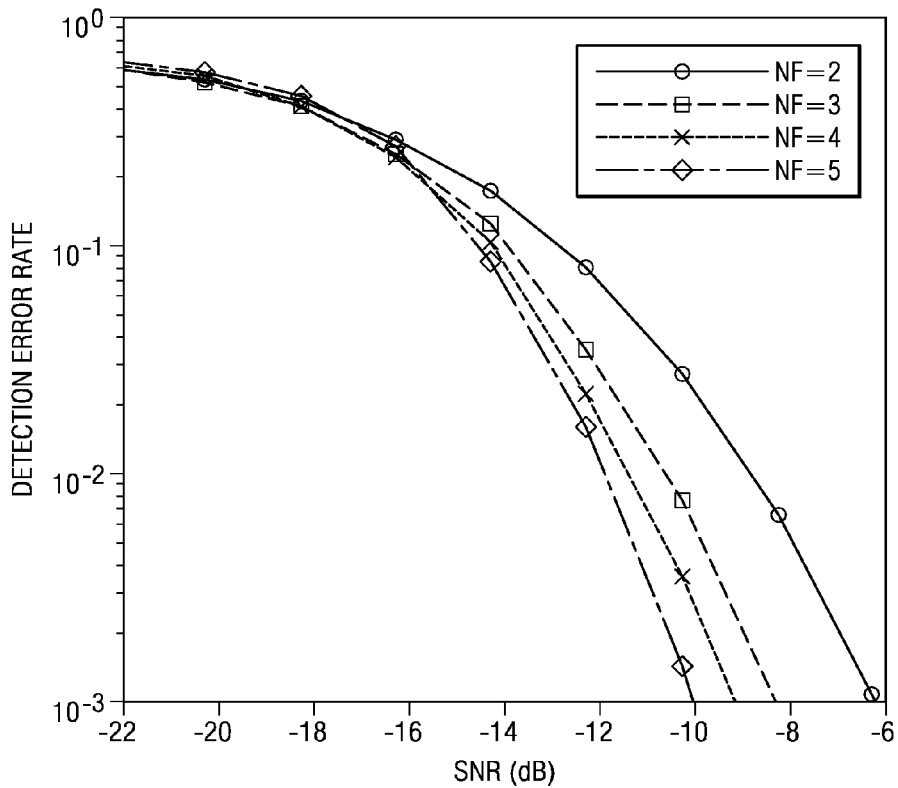

FIGS. 11E-11G depict the performance of Stages 2, and 3, and the optional detection of the number of transmit antennas. It may be noted that the performance of Stage 1 (FFT timing detection) for Scheme 2 (with frequency domain (FD) S-SCH) employing a four symbol preamble is identical to that of Stage 1 for Scheme 2 (TD S-SCH) with a five symbol preamble. Similarly, stage 4 (fine timing detection) for Scheme 2 with a four symbol preamble has the same performance as Stage 3 for Scheme 1 with a five symbol preamble.

The required number of frames for each stage is as follows:
Stage 1 (FFT timing): 2-3 frames,
Stage 2 (PSC & integer offset): 4-5 frames,
Stage 3 (SSC detection): 5-6 frames,
Stage 3b (optional NTXA detection): 3 frames, and
Stage 4 (fine timing): 1-2 frames.

Data bandwidth and scrambling code detection are not simulated. This gives a total of more than 12-16 frames to complete one initial cell search process without optional NTXA (number of transmit antennas) detection. Otherwise, the total number of frames is more than 15-19.

The cell search time for different SCH configurations is summarized in Table 2, below.

TABLE 2

Cell search time comparison

| SCH config | Cell search time (frames) | Overhead for data BW | | Obtained information |
|---|---|---|---|---|
| | | 1.25 MHz | 5 MHz | |
| TD-SCH 5-symbol | 6–9 | 3.57% | 0.89% | Cell ID, NTXA, BW |
| FD-SCH 4-symbol | >12–16 (w/o NTXA detection) | 2.86% | 0.71% | Cell ID |
| | >15–19 (w/NTXA detection) | | | Cell ID, NTXA |

In summary, the SCH with TD S-SCH achieves up to 50% smaller cell search time than FD S-SCH for the same overhead. For the SCH with FD S-SCH, the previously shown cell search times do not include data bandwidth and scrambling code detection and therefore, more information is obtained when TD S-SCH is used. Another advantage of the TD S-SCH approach is its lower cell search procedure complexity. The superiority of SCH with TD S-SCH may be attributed to the following factors. Additionally, the length of primary synchronization codes (PSCs) is two times longer when the S-SCH is multiplexed with P-SCH in the time domain. Essentially, this implies that the power allocated to the P-SCH is two times higher when the P-SCH and S-SCH are multiplexed in the time domain. The TD S-SCH employs an error correcting code to the SSC. Given the length of the SSC (e.g., 14 bits), the rate and length of the TD S-SCH are chosen such that the SSC can be detected with approximately equal accuracy to the preceding stages in the cell search process.

For both Schemes 1 and 2, it may be desirable to introduce the repetitive structure (e.g., 2× or 4× repetition) within each of the OFDM symbols instead of across OFDM symbols in the preamble. In that case, a modification in the frequency domain structures in FIGS. 4 and 9 is required. An N time repetition in the time domain may be obtained by inserting (N−1) nulls between two tones in the frequency domain pattern.

As mentioned before, the above preamble lengths are simply exemplary. For example, it is possible to have only one P-SCH symbol and one S-SCH symbol within a preamble. Also, the location of the preamble within each frame can be arbitrary although it is customary to position it at the beginning of each frame.

Figure 12A:
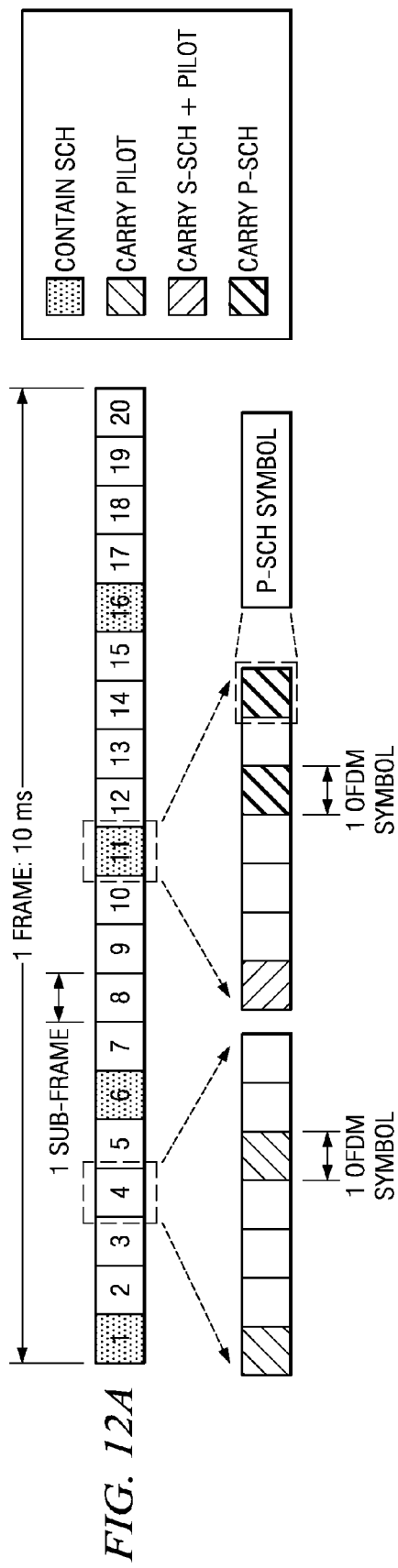
FIGS. 12A and 12B illustrate two embodiments of SCH employing a distributed structure.
Figure 12B:
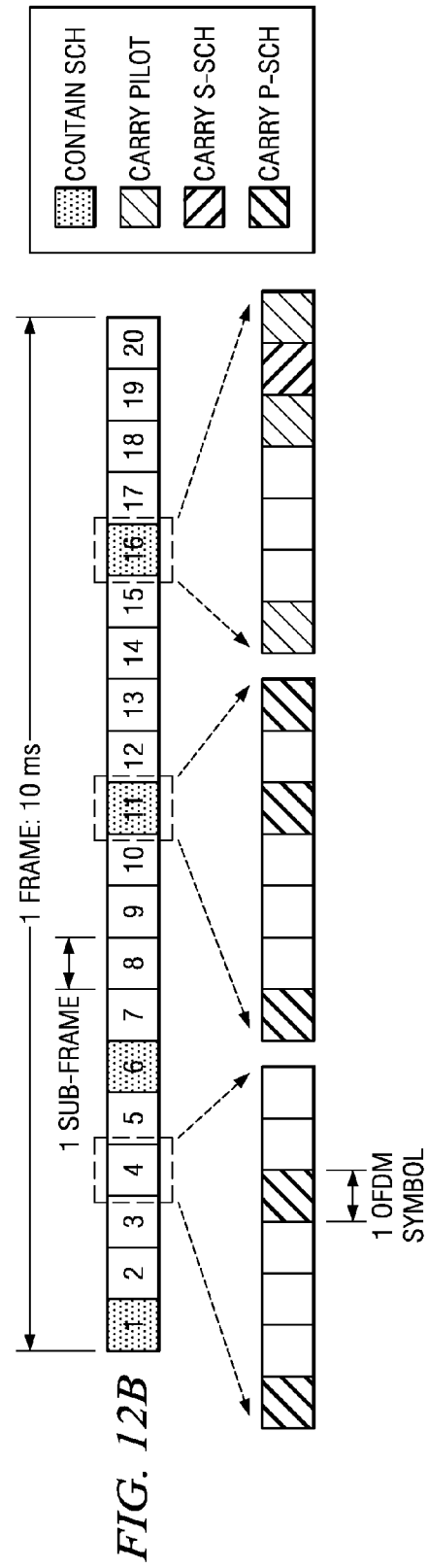

The previous embodiments correspond to the lumped SCH structure. Alternatively, the SCH can be distributed across each frame. Embodiments of an OFDMA-based (cellular) downlink synchronization signal (SCH) employing distributed structures are now addressed. Recall that the SCH structure consists of both the primary SCH (P-SCH) and secondary SCH (S-SCH). Two exemplary embodiments for the distributed structure are depicted in FIGS. 12A and 12B. The P-SCH is repeated several times across the frame. Four times insertion is assumed, but in general, any other insertion factor may also be used. It is also assumed in that P-SCH is inserted in the last OFDM symbol of a sub-frame although the position within the sub-frame is quite arbitrary. In FIG. 12A, the P-SCH is transmitted in the same sub-frame as S-SCH. One full OFDM symbol with a two times repetitive structure is dedicated for the P-SCH, whereas the S-SCH uses a portion of the pilot tones. Therefore, the S-SCH does not result in any additional overhead. In FIG. 12B, a dedicated OFDM symbol is allocated to the S-SCH. The location of the S-SCH is also arbitrary as long as it is in the same sub-frame as one of the P-SCHs.

Figure 13A:
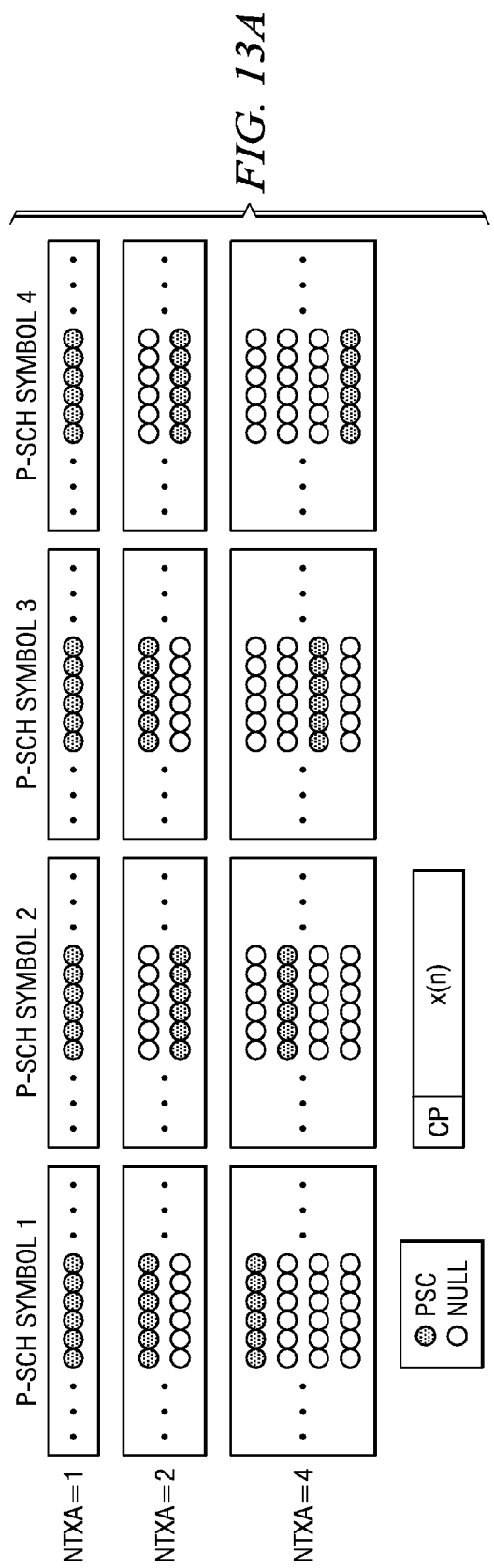
FIGS. 13A and 13B illustrate two frequency domain structures for SCH with distributed structures.
Figure 13B:
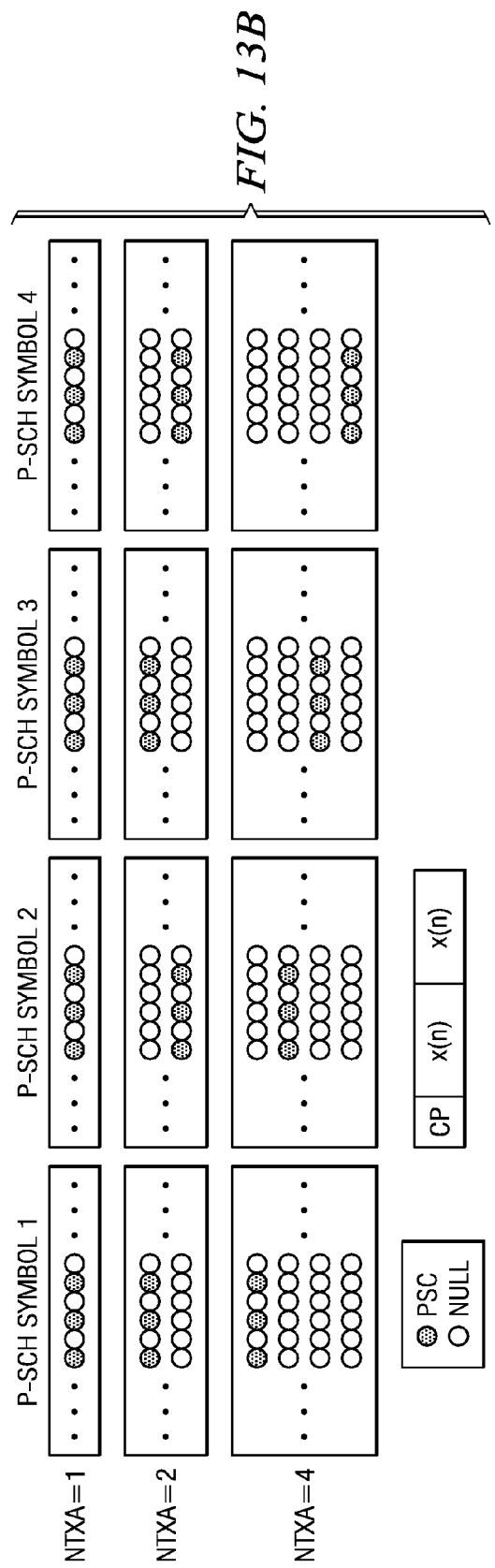

The frequency domain pattern of P-SCH is given in FIGS. 13A and 13B. Here, time-switched transmit diversity (TSTD) is used to obtain diversity gain for a multi-antenna base station. However, other transmit diversity schemes may be used provided that the user equipment is not required to know the number of transmit antennas. An example of such schemes is cyclic delay diversity. In FIG. 13A, all the P-SCH tones are utilized which results in a non-repetitive time domain structure. A two time repetitive structure within each symbol may also be utilized, which results in the structure depicted in FIG. 13B where every other P-SCH tone is utilized. The repetitive structure facilitates the use of differential auto-correlation timing detection technique. It should be noted, however, that the well-known cross-correlation detection performs much better than differential auto-correlation.

Figure 14:
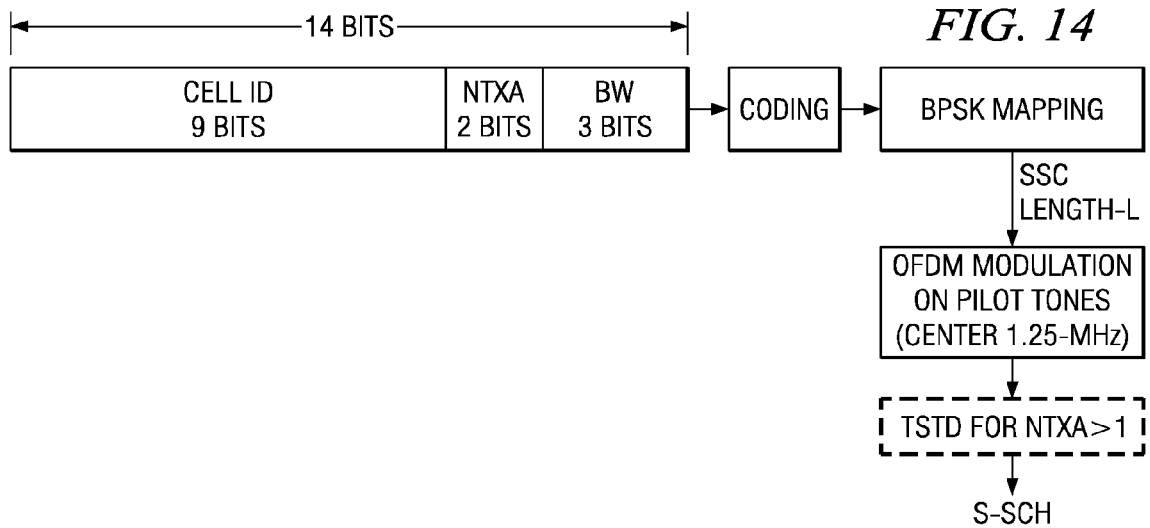
FIG. 14 illustrates the generation of S-SCH.

To obtain the size of the data bandwidth and the number of base station antennas as early as possible, they may be transmitted via S-SCH along with the cell ID. As shown in FIG. 14, the three parameters are jointly encoded using an FEC (e.g., using convolutional coding), symbol modulated (e.g., BPSK), interleaved, and OFDM modulated. For multi-antenna base stations, the same transmit diversity scheme as that employed in P-SCH may be used. In FIG. 14, TSTD is used in accordance to FIGS. 13A and 13B. The resulting codeword is then partitioned into several parts depending on the number of allocated OFDM symbols and the number of SCH tones. The exact code rate may be adjusted to fit the desired codeword length. Similar to the lumped SCH embodiments, the cell-specific parameters and the number of bits given in FIG. 14 are exemplary. Each cell-specific parameter may be full or partial, and the length may also be arbitrary. Also, other cell-specific parameters such as the CP size and cell configuration may be embedded.

The decoding process for S-SCH uses the channel estimates from P-SCH. Also, since the frame timing is still unknown, blind decoding is used by testing all of the four possibilities and choosing the one resulting in the highest decoding metric. When used together with the symbol timing, this gives an estimate of the frame timing.

The S-SCH contains the cell-specific information that is encoded into the SSC where the P-SCH is used to obtain the channel estimates necessary for decoding the SSC. This approach has some potential problems for tightly synchronized networks. Recall that a common PSC may be employed in embodiments of the invention. When the PSC is common to all cells, the channel seen by the PSC is a superposition of all channels between all base stations in the network and the UE (analogous to the case for broadcast/multicast). The channel seen by the SSC, however, is the channel between the serving base station and the UE (analogous to the case for a unicast data transmission). This mismatch is severe especially for UEs at the cell edges where the UE receives two equally strong and overlapping channels from two significant base stations. Another problem associated with a common PSC is the timing mismatch between the channel experienced by the PSC and the unicast data transmission. In this case, the timing obtained from the PSC may result in performance degradation when used to demodulate a unicast data transmission. This problem is relevant for all timing detection techniques such as differential auto-correlation and replica cross-correlation. Those two aforementioned problems become more serious for network with medium to large cells and upon handover where the operating SNR is very low.

Figure 15A:
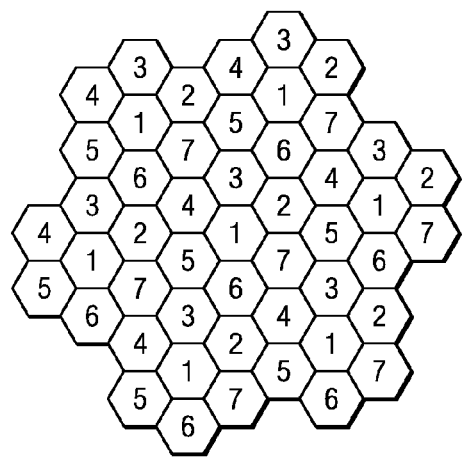
FIGS. 15A and 15B illustrate an exemplary PSC planning for multiple cells (with 7 PSCs) and the associated receiver operation (with 8 PSCs)

To solve this problem, a small set of N different PSCs (e.g., N=8), may be used to differentiate the cells within the first tier. This avoids the channel mismatch between P-SCH and unicast channels, which includes S-SCH and unicast data transmissions, and allows the UE to perform channel estimation on the P-SCH and then use the output to decode S-SCH. The number of codes is kept small to avoid an unnecessary increase in acquisition complexity and detection error probability. An exemplary PSC planning is depicted in FIG. 15A for N=7, which is easily extended to N=8. This pattern is similar to the frequency reuse of seven pattern. Observe that the channel combining from the first and second tiers is completely avoided. Hence, the effect of channel mismatch is greatly reduced.

Figure 15B:
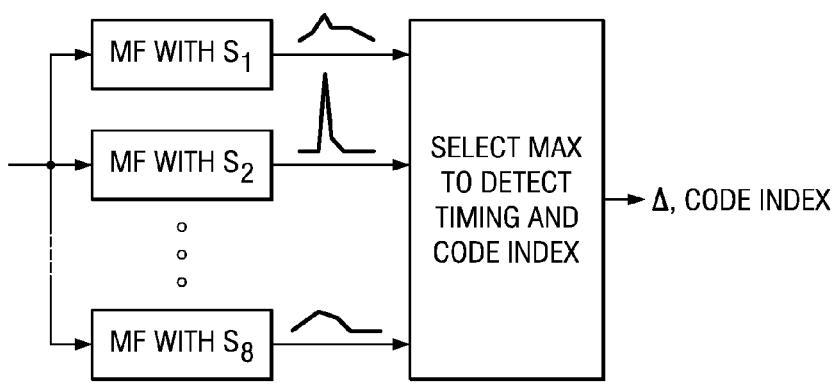

When used with the replica cross-correlation timing detection, the proposed solution suggests a receiver implementation depicted in FIG. 15B, where the timing and PSC index are jointly detected. That is, the received signal is correlated with each of the N candidate PSCs (N=8 in FIG. 15B). Upon comparing the N correlation profiles, the peak indicates the correct timing as well as the PSC index. To reduce the receiver complexity, further optimization of the receiver operation is still possible. By exploiting the inherent structures of the sequences the correlation can be performed more efficiently. For example, when the sequences are binary-valued $\{+1,-1\}$ in the time domain, only real additions are required. If each of the sequences possesses an L-level hierarchical structure, L-level convolution can be used to perform the correlation.

Instead of employing cross-correlation, timing detection algorithms that utilize auto-correlation may also be employed. This is possible when the P-SCH signal has certain symmetric properties, such as the time-domain repetition depicted in FIG. 13B. In this case, the receiver can employ the well-known differential auto-correlation algorithm to obtain a timing estimate only once without having to detect the PSC index. The PSC index can then be detected afterwards. Although the timing estimate obtained from the auto-correlation algorithm may be less accurate than that obtained from the cross-correlation algorithm, this scheme allows the receiver to decouple timing estimation and PSC index detection. This results in lower complexity. Yet another possible symmetric property is the mirror symmetry at the half point of the P-SCH symbol. This occurs only when frequency-domain real-valued sequences are employed. This property facilitates the use of reverse differential auto-correlation algorithm which also permits the receiver to decouple timing estimation and PSC index detection.

Each of the N PSCs also serves as a partial cell-ID. This can be used to reduce the number of bits required to convey the cell-ID (full or partial) in the S-SCH. It also reduces the burden for full cell-ID detection if another method (e.g., pilot-based) is used along with cell search to obtain the full cell-ID. Alternatively, if the same number of bits is used in the S-SCH, it can be used to increase the total number of cell IDs which implies better network flexibility.

While the above N-PSC solution is described in the context of an OFDM/OFDMA system, it is also applicable for other systems (e.g., CDMA or TDMA) which operate in tightly synchronized networks. The above N-PSC solution is applicable for both lumped and distributed SCH embodiments.

Referring now to FIG. 16, illustrated is a flow diagram of an embodiment of a method of operating a base station transmitter, generally designated 1600, carried out in accordance with the principles of the present invention. The method 1600 is for use with an OFDM or OFDMA communication system and starts in a step 1605. Then, in a step 1610, a cellular downlink synchronization signal having primary and secondary portions, wherein the primary portion is common for all cells, are provided. The cellular downlink synchronization signal is scaleable for a number of transmit antennas. The primary and secondary portions are multiplexed and employ at least one of time domain and frequency domain multiplexing in the cellular downlink synchronization signal. Additionally, each of the primary and secondary portions employs at least one synchronization code.

The secondary portion, which is cell-specific, is provided in a step 1615. The secondary portion incorporates a scaling factor that indicates the number of transmit antennas. The secondary portion is generated by encoding and modulating bits to provide cell-specific parameters. The cell-specific parameters include at least cell identification information and an indication of a number of transmit antennas employed in transmitting the cellular downlink synchronization signal. The cellular downlink synchronization signal is transmitted in a step 1620. The method 1600 ends in a step 1625.

Referring now to FIG. 17, illustrated is a flow diagram of an alternate embodiment of a method of operating a base station transmitter, generally designated 1700, carried out in accordance with the principles of the present invention. The method 1700 is for use with an OFDM or OFDMA communication system and starts in a step 1705. Then, in a step 1710, a cellular downlink synchronization signal having primary and secondary portions is provided. The primary portion employs a corresponding one of a plurality of different primary signals allocated to adjoining transmission cells. The cellular downlink synchronization signal is scaleable for a number of transmit antennas. The primary and secondary portions are multiplexed and employ at least one of time domain and frequency domain multiplexing in the cellular downlink synchronization signal.

Cell-specific information is further provided in the secondary portion in a step 1715. The secondary portion incorporates a scaling factor that indicates the number of transmit antennas. The secondary portion is generated by encoding and modulating bits to provide cell-specific parameters. The cell-specific parameters include at least cell identification information and a number of transmit antennas employed in transmitting the cellular downlink synchronization signal. The cellular downlink synchronization signal is transmitted in a step 1720, and the method 1700 ends in a step 1725.

Referring now to FIG. 18, illustrated is a flow diagram of an embodiment of a method of operating a user equipment receiver, generally designated 1800, carried out in accordance with the principles of the present invention. The method 1800 is for use with an OFDM or OFDMA communication system and starts in a step 1805. Then, in a step 1810, a cellular downlink synchronization signal having primary and secondary portions is received. The primary and secondary portions are multiplexed and employ at least one of time domain and frequency domain multiplexing in the cellular downlink synchronization signal. A number of transmit antennas may be determined through a comparison of the primary portion and the secondary portion. Additionally, receiver processing is independent of the number of transmit antennas.

The primary portion of the cellular downlink synchronization signal is employed to perform timing acquisition and frequency offset estimation and correction in a step 1815. In one embodiment, the primary portion is common for all cells and a timing acquisition is performed by correlating the primary portion with a replica of the primary portion. In another embodiment, the primary portion employs one of a plurality of different primary signals allocated to adjoining transmission cells and a timing acquisition is performed by correlating the primary portion with a corresponding one of a plurality of replicas of the plurality of different primary signals. The correlation employed in either of these embodiments may be used to obtain a partial cell identification.

Once the timing and frequency locks are established, in the step 1815, the secondary portion is identified and extracted in step 1820. The secondary portion is then employed to provide cell-specific parameters in a step 1825. Cell-specific parameters are determined by demodulating and decoding the secondary portion of the cellular downlink synchronization signal. The cell-specific parameters include at least cell identification information and a number of transmit antennas employed in transmitting the cellular downlink synchronization signal. The method 1800 ends in a step 1830.

An issue that has not been explicitly discussed is the one of code design for the primary synchronization code (PSC). In general, the PSC can be defined in the time or frequency domains. While defining the code in the frequency domain is more natural for OFDM/OFDMA, defining the code in the time domain may provide better correlation properties and receiver complexity reduction. Also, when M OFDM symbols (for M greater than one) are allocated for P-SCH, the same PSC can be repeated across M P-SCH symbols, or one PSC (M times longer) can used to modulate the M P-SCH symbols. Typically, PSC is chosen to have good auto-correlation properties. Some examples are the class of constant amplitude zero auto-correlation (CAZAC), Golay, and Walsh-Hadamard sequences. For the N-PSC solution, N codes with good auto-correlation properties are selected that have minimum pair-wise cross-correlation characteristics.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

Although the present invention has been described in detail, those skilled in the art should understand that they can make various changes, substitutions and alterations herein without departing from the spirit and scope of the invention in its broadest form.

What is claimed is:

1. A method of operating a base station transmitter for use with an OFDM or OFDMA communication system, comprising:
   providing a cellular downlink synchronization signal having primary and secondary portions, wherein said primary portion is common for all cells and said secondary portion includes cell parameters in addition to cell-ID; and
   transmitting said cellular downlink synchronization signal.

2. The method as recited in claim 1 wherein said cellular downlink synchronization signal is scaleable for a number of transmit antennas.

3. The method as recited in claim 2 wherein said secondary portion incorporates a scaling factor that indicates said number of transmit antennas.

4. The method as recited in claim 1 wherein said secondary portion is generated by encoding and modulating bits to provide cell-specific parameters.

5. The method as recited in claim 4 wherein said cell-specific parameters include at least cell identification information and a number of transmit antennas employed in transmitting said cellular downlink synchronization signal.

6. The method as recited in claim 1 wherein said primary and secondary portions are multiplexed and employ at least one of time domain and frequency domain multiplexing in said cellular downlink synchronization signal.

7. The method as recited in claim 1 wherein each of said primary and secondary portions employs at least one synchronization code.

8. A base station transmitter for use with an OFDM or OFDMA communication system, comprising:
   a synchronization unit configured to provide a cellular downlink synchronization signal having primary and secondary portions, wherein said primary portion is common for all cells and said secondary portion includes cell parameters in addition to cell-ID; and
   a transmit unit configured to transmit said cellular downlink synchronization signal.

9. The transmitter as recited in claim 8 wherein said cellular downlink synchronization signal is scaleable for a number of transmit antennas.

10. The transmitter as recited in claim 9 wherein said secondary portion incorporates a scaling factor that indicates said number of transmit antennas.

11. The transmitter as recited in claim 8 wherein said secondary portion is generated by encoding and modulating bits to provide cell-specific parameters.

12. The transmitter as recited in claim 11 wherein said cell-specific parameters include at least cell identification information and a number of transmit antennas employed in transmitting said cellular downlink synchronization signal.

13. The transmitter as recited in claim 8 wherein said primary and secondary portions are multiplexed and employ at least one of time domain and frequency domain multiplexing in said cellular downlink synchronization signal.

14. The transmitter as recited in claim 8 wherein each of said primary and secondary portions employs at least one synchronization code.

15. A method of operating a base station transmitter for use with an OFDM or OFDMA communication system, comprising:
   providing a cellular downlink synchronization signal having primary and secondary portions wherein said primary portion employs a corresponding one of a plurality of different primary signals allocated to adjoining transmission cells;
   further providing cell-specific information in addition to cell-ID in said secondary portion; and
   transmitting said cellular downlink synchronization signal.

16. The method as recited in claim 15 wherein said cellular downlink synchronization signal is scaleable for a number of transmit antennas.

17. The method as recited in claim 16 wherein said secondary portion incorporates a scaling factor that indicates said number of transmit antennas.

18. The method as recited in claim 15 wherein said secondary portion is generated by encoding and modulating bits to provide cell-specific parameters.

19. The method as recited in claim 18 wherein said cell-specific parameters include at least cell identification information and a number of transmit antennas employed in transmitting said cellular downlink synchronization signal.

20. The method as recited in claim 15 wherein said primary and secondary portions are multiplexed and employ at least one of time domain and frequency domain multiplexing in said cellular downlink synchronization signal.

21. A base station transmitter for use with an OFDM or OFDMA communication system, comprising:
- a synchronization unit configured to provide a cellular downlink synchronization signal having primary and secondary portions wherein said primary portion employs a corresponding one of a plurality of different primary signals allocated to adjoining transmission cells and said secondary portion includes cell parameters other than cell-ID; and
- a transmit unit configured to transmit said cellular downlink synchronization signal.

22. The transmitter as recited in claim 21 wherein said cellular downlink synchronization signal is scaleable for a number of transmit antennas.

23. The transmitter as recited in claim 22 wherein said secondary portion incorporates a scaling factor that indicates said number of transmit antennas.

24. The transmitter as recited in claim 21 wherein said secondary portion is generated by encoding and modulating bits to provide cell-specific parameters.

25. The transmitter as recited in claim 24 wherein said cell-specific parameters include at least cell identification information and a number of transmit antennas employed in transmitting said cellular downlink synchronization signal.

26. The transmitter as recited in claim 21 wherein said primary and secondary portions are multiplexed and employ at least one of time domain and frequency domain multiplexing in said cellular downlink synchronization signal.

27. A method of operating a user equipment receiver for use with an OFDM or OFDMA communication system, comprising:
- receiving a cellular downlink synchronization signal having primary and secondary portions not derived from a pilot channel, wherein said secondary portion includes cell parameters in addition to cell-ID; and
- identifying and extracting said secondary portion.

28. The method as recited in claim 27 wherein said primary portion is common for all cells and a timing acquisition is performed by correlating said primary portion with a replica of said primary portion.

29. The method as recited in claim 27 wherein said primary portion employs one of a plurality of different primary signals allocated to adjoining transmission cells and a timing acquisition is performed by correlating said primary portion with a corresponding one of a plurality of replicas of said plurality of different primary signals.

30. The method as recited in claim 29 wherein a partial cell identification is obtained by said correlating.

31. The method as recited in claim 27 wherein receiver processing is independent of a number of transmit antennas.

32. The method as recited in claim 27 wherein a number of transmit antennas is determined through a comparison of said primary portion and said secondary portion.

33. The method as recited in claim 27 wherein cell-specific parameters are determined by demodulating and decoding said secondary portion of said cellular downlink synchronization signal.

34. The method as recited in claim 33 wherein said cell-specific parameters include at least cell identification information and a number of transmit antennas employed in transmitting said cellular downlink synchronization signal.

35. The method as recited in claim 33 wherein said primary and secondary portions are multiplexed and employ at least one of time domain and frequency domain multiplexing in said cellular downlink synchronization signal.

36. The method as recited in claim 27 wherein said primary portion of said cellular downlink synchronization signal is employed to perform timing acquisition and frequency offset estimation and correction.

37. A user equipment receiver for use with an OFDM or OFDMA communication system, comprising:
- a receive unit configured to receive a cellular downlink synchronization signal having primary and secondary portions not derived from a pilot channel, wherein said secondary portion includes cell parameters in addition to cell-ID; and
- a processing unit configured to identify and extract said secondary portion.

38. The receiver as recited in claim 37 wherein said primary portion is common for all cells and a timing acquisition is performed by correlating said primary portion with a replica of said primary portion.

39. The receiver as recited in claim 37 wherein said primary portion employs one of a plurality of different primary signals allocated to adjoining transmission cells and a timing acquisition is performed by correlating said primary portion with a corresponding one of a plurality of replicas of said plurality of different primary signals.

40. The transmitter as recited in claim 39 wherein a partial cell identification is obtained by said correlating.

41. The transmitter as recited in claim 37 wherein receiver processing is independent of a number of transmit antennas.

42. The transmitter as recited in claim 37 wherein a number of transmit antennas is determined through a comparison of said primary portion and said secondary portion.

43. The transmitter as recited in claim 37 wherein cell-specific parameters are determined by demodulating and decoding said secondary portion of said cellular downlink synchronization signal.

44. The transmitter as recited in claim 43 wherein said cell-specific parameters include at least cell identification information and a number of transmit antennas employed in transmitting said cellular downlink synchronization signal.

45. The transmitter as recited in claim 43 wherein said primary and secondary portions are multiplexed and employ at least one of time domain and frequency domain multiplexing in said cellular downlink synchronization signal.

46. The transmitter as recited in claim 37 wherein said primary portion of said cellular downlink synchronization signal is employed to perform timing acquisition and frequency offset estimation and correction.

47. A cellular communication system, comprising:
- a manager that allocates a set of primary synchronization codes to a plurality of cells;
- a centric cellular transmitter that provides a cellular downlink synchronization signal employing one of said primary synchronization codes; and
- a plurality of adjacent cellular transmitters that provide cellular downlink synchronization signals having corresponding primary synchronization codes that are distinguishable from said one of said primary synchronization codes.

48. The system as recited in claim 47 wherein each of said plurality of adjacent cellular transmitters is located in a transmission cell that is contiguous to a centric cell having said centric cellular transmitter.

49. The system as recited in claim 47 wherein at least a portion of said corresponding primary synchronization codes are distinguishable from each other.

50. The system as recited in claim 47 wherein each transmitter is an OFDM or OFDMA transmitter.

51. A method of operating a base station transmitter, comprising:
- providing a downlink synchronization signal having primary and secondary portions wherein said primary portion employs a corresponding one of a plurality of different primary signals;
- further providing cell-specific information in addition to cell-ID in said secondary portion; and
- transmitting said cellular downlink synchronization signal.

52. A base station transmitter, comprising:
- a synchronization unit configured to provide a downlink synchronization signal having primary and secondary portions wherein said primary portion employs a corresponding one of a plurality of different primary signals and said secondary portion includes cell parameters in addition to cell-ID; and
- a transmit unit configured to transmit said cellular downlink synchronization signal.

* * * * *